(12) United States Patent
Watanabe

(10) Patent No.: US 11,064,177 B2
(45) Date of Patent: Jul. 13, 2021

(54) IMAGE PROCESSING APPARATUS, IMAGING APPARATUS, MOBILE DEVICE CONTROL SYSTEM, IMAGE PROCESSING METHOD, AND RECORDING MEDIUM

(71) Applicant: RICOH COMPANY, LTD., Tokyo (JP)

(72) Inventor: Genki Watanabe, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 75 days.

(21) Appl. No.: 16/105,437

(22) Filed: Aug. 20, 2018

(65) Prior Publication Data
US 2019/0014302 A1 Jan. 10, 2019

Related U.S. Application Data

(63) Continuation of application No. PCT/JP2017/002067, filed on Jan. 23, 2017.

(30) Foreign Application Priority Data

Feb. 22, 2016 (JP) .............................. JP2016-030963

(51) Int. Cl.
*H04N 13/128* (2018.01)
*G06T 7/593* (2017.01)
(Continued)

(52) U.S. Cl.
CPC ....... *H04N 13/128* (2018.05); *G06K 9/00805* (2013.01); *G06K 9/00825* (2013.01);
(Continued)

(58) Field of Classification Search
CPC .. G06K 9/00805; G06K 9/00825; G06K 9/44; G06K 9/6289; G06T 1/00;
(Continued)

(56) References Cited

U.S. PATENT DOCUMENTS

2007/0140527 A1* 6/2007 Yamamoto ......... G06K 9/00805
382/104
2010/0226532 A1* 9/2010 Hayasaka ............ G06K 9/6203
382/103
(Continued)

FOREIGN PATENT DOCUMENTS

EP 2 538 242 A1 12/2012
JP H11-039596 2/1999
(Continued)

OTHER PUBLICATIONS

Extended European Search Report dated Feb. 5, 2019 in the corresponding European Application No. 17756047.1 9 pages.
(Continued)

*Primary Examiner* — Joon Kwon
(74) *Attorney, Agent, or Firm* — Xsensus LLP

(57) ABSTRACT

An image processing apparatus includes a first generator configured to generate a first distance image corresponding to a first distance from an imager, by using an image captured by the imager; a second generator configured to generate a second distance image corresponding to a second distance that is further away from the imager than the first distance, by using an image captured by the imager; a reducer configured to reduce the first distance image; a first detector configured to detect a body positioned within the first distance, based on the first distance image reduced by the reducer; and a second detector configured to detect a body positioned within the second distance, based on the second distance image.

18 Claims, 23 Drawing Sheets

(51) Int. Cl.
- *G06K 9/00* (2006.01)
- *G06K 9/62* (2006.01)
- *G08G 1/16* (2006.01)
- *G06T 1/00* (2006.01)
- *G06T 7/00* (2017.01)
- *G06K 9/44* (2006.01)
- *H04N 13/00* (2018.01)

(52) U.S. Cl.
CPC ............ *G06K 9/44* (2013.01); *G06K 9/6289* (2013.01); *G06T 1/00* (2013.01); *G06T 7/00* (2013.01); *G06T 7/593* (2017.01); *G08G 1/16* (2013.01); *G08G 1/166* (2013.01); *G06T 2207/10028* (2013.01); *G06T 2207/20228* (2013.01); *G06T 2207/30261* (2013.01); *G06T 2210/12* (2013.01); *H04N 2013/0081* (2013.01)

(58) Field of Classification Search
CPC . G06T 2207/10028; G06T 2207/20228; G06T 2207/30261; G06T 2210/12; G06T 7/00; G06T 7/593; G08G 1/16; G08G 1/166; H04N 13/128; H04N 2013/0081
See application file for complete search history.

(56) References Cited

U.S. PATENT DOCUMENTS

| | | | |
|---|---|---|---|
| 2012/0327197 A1* | 12/2012 | Yamashita | G03B 35/18 348/50 |
| 2013/0202158 A1* | 8/2013 | Nakao | G06T 7/248 382/107 |
| 2014/0064608 A1* | 3/2014 | Kim | G06K 9/00201 382/154 |
| 2014/0253679 A1 | 9/2014 | Guigues et al. | |
| 2014/0354450 A1* | 12/2014 | Takahashi | B60Q 9/008 340/904 |
| 2015/0169969 A1* | 6/2015 | Honda | G06K 9/3233 382/103 |
| 2016/0014406 A1 | 1/2016 | Takahashi et al. | |
| 2016/0277397 A1 | 9/2016 | Watanabe | |
| 2018/0197020 A1* | 7/2018 | Gomezcaballero | G06K 9/209 |

FOREIGN PATENT DOCUMENTS

| | | |
|---|---|---|
| JP | 2005-211488 | 8/2005 |
| JP | 2008-158946 | 7/2008 |
| JP | 2014-032444 | 2/2014 |
| WO | 2011/105388 A1 | 9/2011 |
| WO | WO 2014/109146 A1 | 7/2014 |

OTHER PUBLICATIONS

International Search Report dated Feb. 14, 2017 in PCT/JP2017/002067 filed on Jan. 23, 2017.
Written Opinion dated Feb. 14, 2017 in PCT/JP2017/002067 filed on Jan. 23, 2017.

* cited by examiner

CAPTURED IMAGE

V MAP

FIG.22

| BODY TYPE | WIDTH | HEIGHT | DEPTH | UNIT (mm) |
|---|---|---|---|---|
| MOTORCYCLE, BICYCLE | <1100 | <2500 | >1000 | |
| PEDESTRIAN | <1100 | <2500 | <=1000 | |
| COMPACT CAR | <1700 | <1700 | <10000 | |
| STANDARD-SIZED CAR | <1700 | <2500 | <10000 | |
| TRUCK | <3500 | <3500 | <15000 | |
| OTHER | DO NOT APPLY TO ABOVE SIZES | | | |

FIG.23

| DATA CATEGORY | DATA NAME | DETAILS |
|---|---|---|
| OBJECT DATA | POSITION | TOP LEFT COORDINATES IN DISPARITY IMAGE (x, y) |
| | SIZE | OBJECT SIZE IN DISPARITY IMAGE (w, h) |
| | DISTANCE | DISTANCE TO SUBJECT (m) |
| | RELATIVE SPEED | RELATIVE SPEED PER FRAME (LATERAL X (m/FRAME), DEPTH Z (m/FRAME)) |
| | ACTUAL POSITION | LATERAL X (m), DEPTH Z (m) |
| | ACTUAL SIZE | LEFT END (m), RIGHT END (m), HEIGHT (m) |
| OBJECT PREDICTION DATA | POSITION | TOP LEFT COORDINATES IN DISPARITY IMAGE (x, y) |
| | SIZE | OBJECT SIZE IN DISPARITY IMAGE (w, h) |
| | DISTANCE | DISTANCE TO SUBJECT (m) |
| OBJECT FEATURE AMOUNT | HISTOGRAM PEAK POSITION | MAXIMUM OF FOUR PEAK POSITIONS |
| | DISTANCE BETWEEN PEAKS | ACTUAL DISTANCE BETWEEN PEAKS (m) |

IMAGE PROCESSING APPARATUS, IMAGING APPARATUS, MOBILE DEVICE CONTROL SYSTEM, IMAGE PROCESSING METHOD, AND RECORDING MEDIUM

CROSS-REFERENCE TO RELATED APPLICATION

The present application is a continuation application of International Application No. PCT/JP2017/002067 filed on Jan. 23, 2017, which claims priority to Japanese Patent Application No. 2016-030963 filed on Feb. 22, 2016. The contents of these applications are incorporated herein by reference in their entirety.

BACKGROUND OF THE INVENTION

1. Field of the Invention

The present invention relates to an image processing apparatus, an imaging apparatus, a mobile device control system, an image processing method, and a program.

2. Description of the Related Art

With respect to the safety of automobiles, conventionally, the body structure of automobiles, etc., has been developed from the viewpoint of protecting pedestrians and passengers when colliding with pedestrians and automobiles. Furthermore, in recent years, with the development of the information processing technology and the image processing technology, techniques for detecting people and automobiles, etc., at high speed, have been developed. By applying these techniques, automobiles that automatically apply brakes before collision to prevent collision, are already on sale.

In order to apply brakes automatically, it is necessary to measure the distance to a body such as a person and another vehicle, etc. Therefore, measurement performed by using a millimeter wave radar, a laser radar, and a stereo camera, is put to practical use.

In the measurement using a stereo camera, there is known a technique of organizing and integrating data of a three-dimensional body that is overlappingly detected at a long distance and a short distance (see, for example, Patent Literature 1).

Patent Literature 1: Japanese Unexamined Patent Application Publication No. H11-039596

SUMMARY OF THE INVENTION

An aspect of the present invention provides an image processing apparatus including a first generator configured to generate a first distance image corresponding to a first distance from an imager, by using an image captured by the imager; a second generator configured to generate a second distance image corresponding to a second distance that is further away from the imager than the first distance, by using an image captured by the imager; a reducer configured to reduce the first distance image; a first detector configured to detect a body positioned within the first distance, based on the first distance image reduced by the reducer; and a second detector configured to detect a body positioned within the second distance, based on the second distance image.

BRIEF DESCRIPTION OF THE DRAWINGS

FIG. 22 is a diagram illustrating an example of table data for classifying object types according to an embodiment of the present invention; and FIG. 23 is an explanatory diagram illustrating an example of data items of an object data list an embodiment of the present invention.

DETAILED DESCRIPTION OF THE PREFERRED EMBODIMENTS

In the related art, there is a problem that when the process of detecting a body is performed at high speed, the accuracy of the detection decreases.

A problem to be solved by an embodiment of the present invention is to provide a technique for performing highly accurate detection at high speed.

Hereinafter, a mobile device control system including an image processing apparatus according to an embodiment will be described.

<Configuration of in-Vehicle Device Control System>

Figure 1:
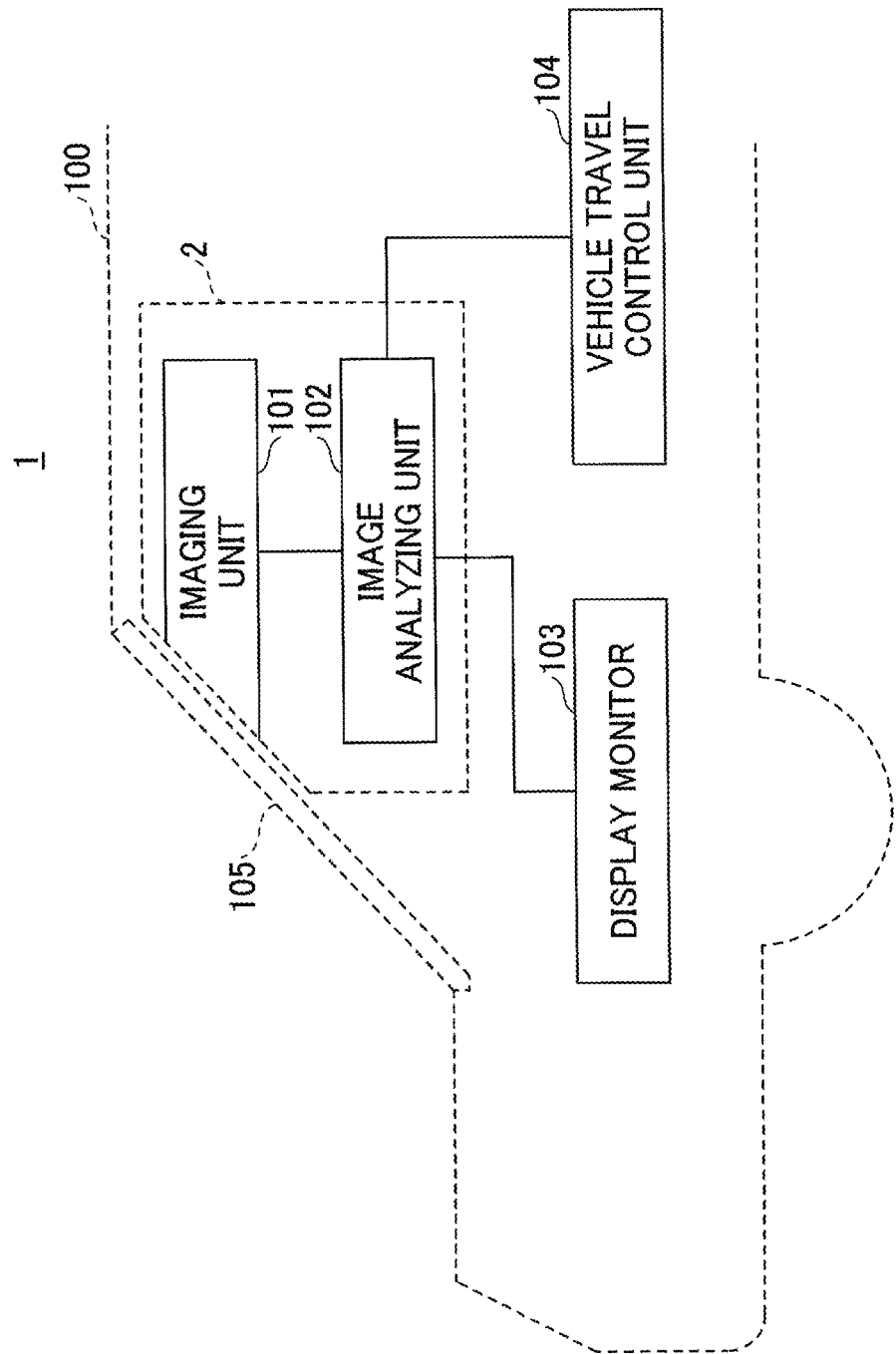
FIG. 1 is a schematic diagram illustrating a configuration of an in-vehicle device control system according to an embodiment of the present invention.

FIG. 1 is a diagram illustrating a configuration of an in-vehicle device control system that is a mobile device control system according to an embodiment of the present invention.

An in-vehicle device control system 1 is installed in a reference vehicle 100 such as an automobile that is a mobile body, and includes an imaging unit 101, an image analyzing unit 102, a display monitor 103, and a vehicle travel control unit 104. In the imaging unit 101, a body in front of the reference vehicle is detected from a plurality of pieces of captured image data (frames) of the front area in the traveling direction of the vehicle (imaging area) obtained by capturing images of the area in front of the mobile body, and the detection result is used to control the mobile body and various in-vehicle devices. The control of the mobile body includes, for example, notification of a warning, control of the steering wheel of the reference vehicle 100 (own mobile body), or control of the brakes of the reference vehicle 100 (own mobile body).

For example, the imaging unit 101 is installed near a room mirror (not illustrated) of a windshield 105 of the reference vehicle 100. Various kinds of data such as captured image data obtained by imaging by the imaging unit 101, are input to the image analyzing unit 102 that is an image processing means.

The image analyzing unit 102 analyzes the data transmitted from the imaging unit 101 to detect the relative height (position information) at each point on the traveling road surface in front of the vehicle, with respect to the road surface portion on which the reference vehicle 100 is traveling (the road surface portion positioned immediately below the reference vehicle), and recognizes the three-dimensional shape of the traveling road surface in front of the reference vehicle. Furthermore, the image analyzing unit 102 recognizes recognition targets such as other vehicles, pedestrians, and various obstacles, etc., in front of the reference vehicle.

The analysis result obtained by the image analyzing unit 102 is sent to the display monitor 103 and the vehicle travel control unit 104. The display monitor 103 displays captured image data obtained by the imaging unit 101 and the analysis result. The vehicle travel control unit 104 carries out travel support control such as reporting a warning to the driver of the reference vehicle 100 and controlling the steering wheel and brakes of the reference vehicle, based on a recognition result of a recognition target such as another vehicle, a pedestrian, and various obstacles, etc., in front of the reference vehicle, obtained by the image analyzing unit 102.

<Configuration of Imaging Unit 101 and Image Analyzing Unit 102>

Figure 2:
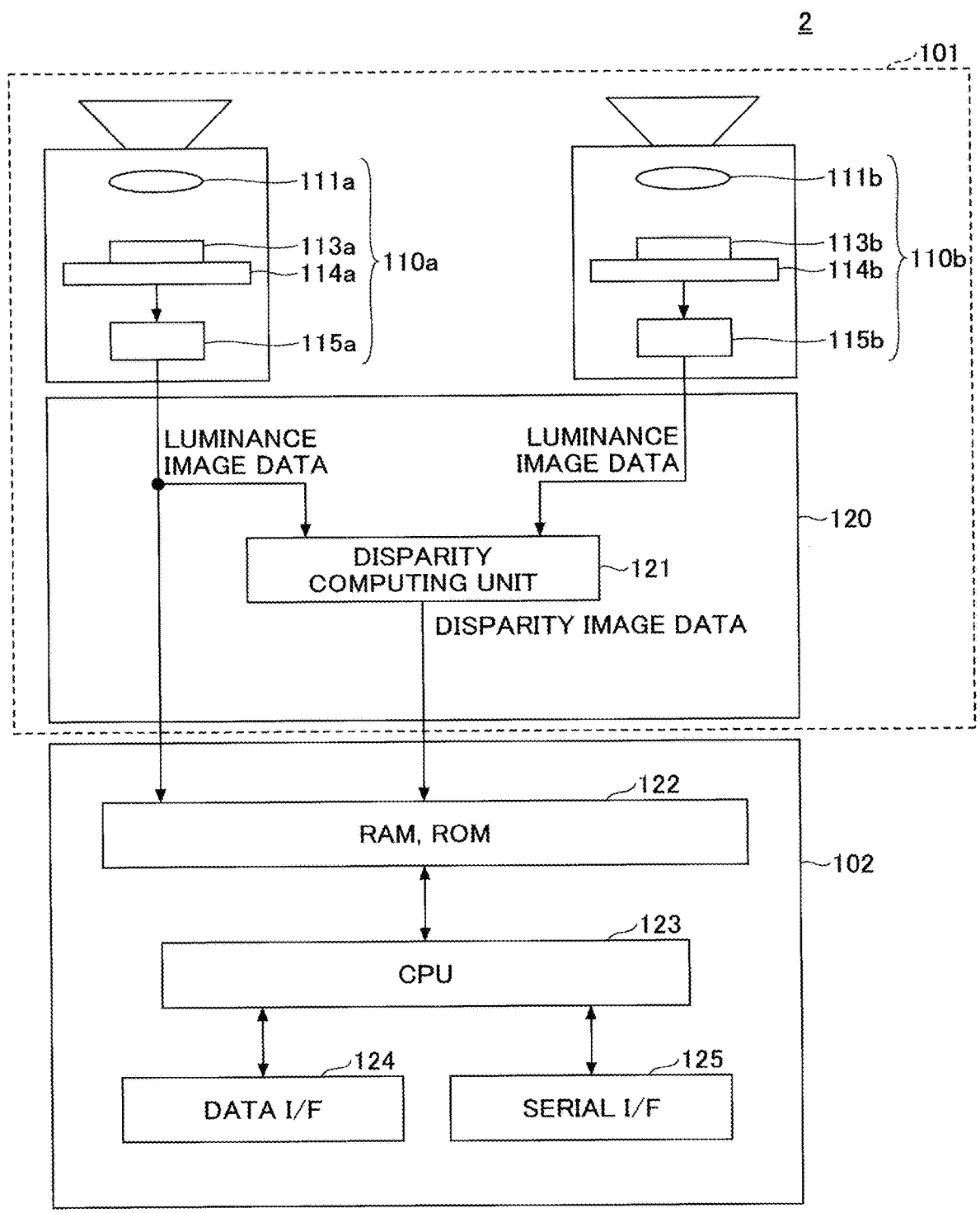
FIG. 2 is a schematic diagram illustrating a configuration of an imaging unit and an image analyzing unit according to an embodiment of the present invention.

FIG. 2 is a diagram illustrating the configurations of the imaging unit 101 and the image analyzing unit 102.

The imaging unit 101 is formed of a stereo camera including two imaging units 110a and 110b as imaging means, and the two imaging units 110a and 110b are the same. The imaging units 110a and 110b respectively include imaging lenses 111a and 111b, sensor substrates 114a and 114b including image sensors 113a and 113b in which light receiving elements are two-dimensionally arranged, and signal processing units 115a and 115b for generating and outputting captured image data obtained by converting analog electric signals (electric signals corresponding to the amount of light received by the respective light receiving elements on the image sensors 113a and 113b), which are output from analog substrates 114a and 114b, into digital electric signals. For example, luminance image data is output from the imaging unit 101.

Furthermore, the imaging unit 101 includes a processing hardware unit 120 including a Field-Programmable Gate Array (FPGA), etc. In order to obtain a disparity image (distance image) from the luminance image data output from the imaging units 110a and 110b, the processing hardware unit 120 includes a disparity computing unit 121 as a disparity image information generating means for computing a disparity value of corresponding image portions between captured images respectively captured by the imaging units 110a and 110b.

The disparity value referred to here is a value obtained by taking one of the captured images captured by the imaging units 110a and 110b as a reference image and the other one of the captured images as a comparison image, and calculating a positional deviation amount of an image portion in the comparison image with respect to an image portion in the reference image corresponding to the same point in the imaging area, as the disparity value of the image portion. By using the principle of triangulation, it is possible to calculate the distance to the same point in the imaging area corresponding to the image portion, based on this disparity value.

Figure 3:
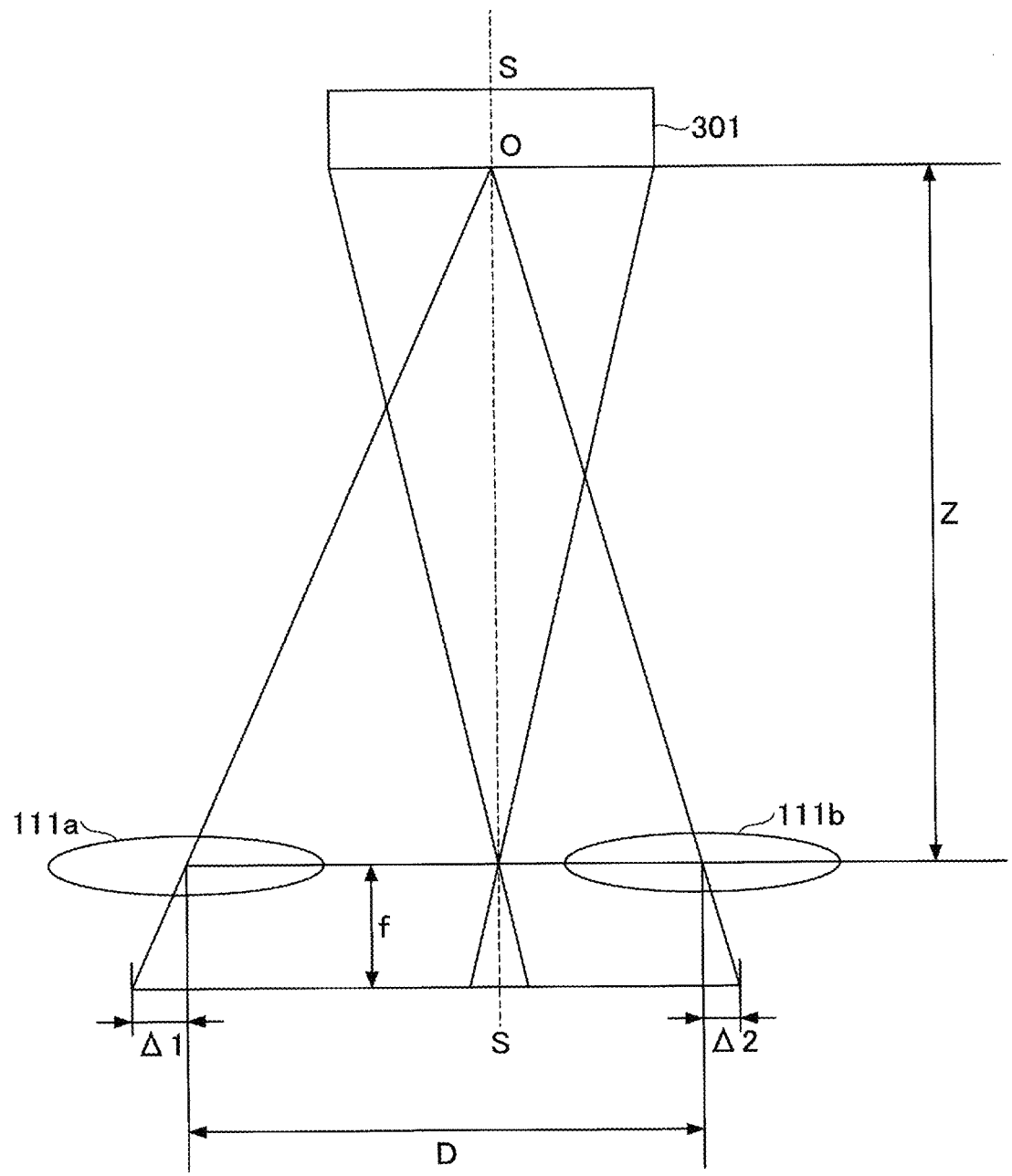
FIG. 3 is a diagram for describing the principle of calculating a distance from a disparity value by using the principle of triangulation according to an embodiment of the present invention.

FIG. 3 is a diagram for describing the principle of calculating the distance based on the disparity value, by using the principle of triangulation. In the figure, f is the focal length of each of the imaging lenses 111a and 111b, and D is the distance between the optical axes. Furthermore, Z is a distance (a distance in a direction parallel to the optical axis) from the imaging lenses 111a and 111b to a subject 301. In this figure, the image formation positions of the left and right images with respect to the point O on the subject 301 are $\Delta 1$ and $\Delta 2$, respectively, from the image formation center. The disparity value d at this time can be defined as $d = \Delta 1 + \Delta 2$.

Referring back to the descriptions of FIG. 2, the image analyzing unit 102 is formed of an image processing substrate, etc., and includes a storage unit 122 formed of a random access memory (RAM) or a read-only memory (ROM), etc., for storing the luminance image data and the disparity image data output from the imaging unit 101, a Central Processing Unit (CPU) 123 that executes a computer program for performing a process of recognizing an identification target and disparity calculation control, etc., a data interface (I/F) 124, and a serial I/F 125.

The FPGA forming the processing hardware unit 120 executes processes requiring real-time processing on image data, for example, gamma correction, distortion correction (parallelization of left and right captured images), and disparity calculation by block matching to generate information of a disparity image, and performs a process of writing the information in the RAM of the image analyzing unit 102. The CPU of the image analyzing unit 102 controls the image sensor controller of each of the imaging units 110a and 110b and controls the overall image processing substrate, and also loads, from the ROM, the programs for executing a process of detecting the three-dimensional shape of the road surface and a process of detecting guard rails and various other objects (bodies), and executes various processes with input of luminance image data and disparity image data, etc., stored in the RAM, and outputs the processing result outside from the data I/F 124 and the serial I/F 125. When executing such processes, the data I/F 124 can be used to input vehicle operation information such as the vehicle speed, the acceleration (mainly acceleration in the longitudinal direction of the reference vehicle), the steering angle, and the yaw rate of the reference vehicle 100, and the vehicle operation information can be used as parameters of various processes. The data output to the outside is used as input data for controlling various devices of the reference vehicle 100 (brake control, vehicle speed control, warning control, etc.).

Note that the imaging unit 101 and the image analyzing unit 102 can be configured as an imaging apparatus 2 that is an integrated device.

Figure 4:
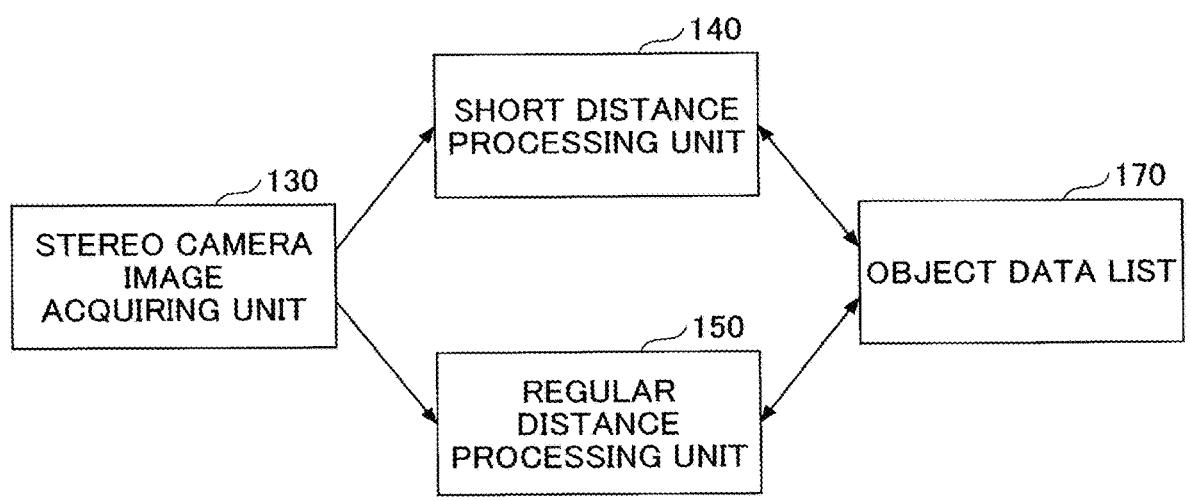
FIG. 4 is a functional block diagram of an imaging apparatus including an image processing apparatus according to an embodiment of the present invention.

FIG. 4 is a functional block diagram of an imaging apparatus including an image processing apparatus that performs body detection processing, which is implemented by the processing hardware unit 120 and the image analyzing unit 102 in FIG. 2.

The imaging apparatus includes a stereo camera image acquiring unit 130, a short distance processing unit 140, a regular distance processing unit 150, and an object data list 170.

The stereo camera image acquiring unit 130 acquires an image photographed with a stereo camera. The short distance processing unit 140 detects and tracks a body positioned at a short distance (within a predetermined distance from the reference vehicle). The regular distance processing unit 150 detects and tracks a body positioned at a distance farther than a short distance. The object data list 170 stores data of a body (object) detected by the short distance processing unit 140 and the regular distance processing unit 150, and also outputs the data to the display monitor 103 and the vehicle travel control unit 104.

Note that the short distance body detecting process by the short distance processing unit 140 and the regular distance body detecting process by the regular distance processing unit 150 may be executed in parallel, at least partially, or may be executed sequentially. For example, the disparity computing unit 121 of the processing hardware unit 120 can perform a disparity image generating process followed by a short distance disparity image generating process, and other processes by the image analyzing unit 102 can be performed in parallel.

Hereinafter, the body detecting process according to the present embodiment will be described.

<Acquisition of Stereo Camera Image>

The stereo camera image acquiring unit 130 acquires the luminance image data from the two imaging units 110a and 110b forming the stereo camera. At this time, when the imaging units 110a and 110b are color imaging units, color luminance conversion for obtaining the luminance signal (Y) from the RGB signals is performed by using, for example, the following formula [1].

$$Y=0.3R+0.59G+0.11B \qquad \text{formula [1]}$$

<Short Distance Process>

Figure 5:
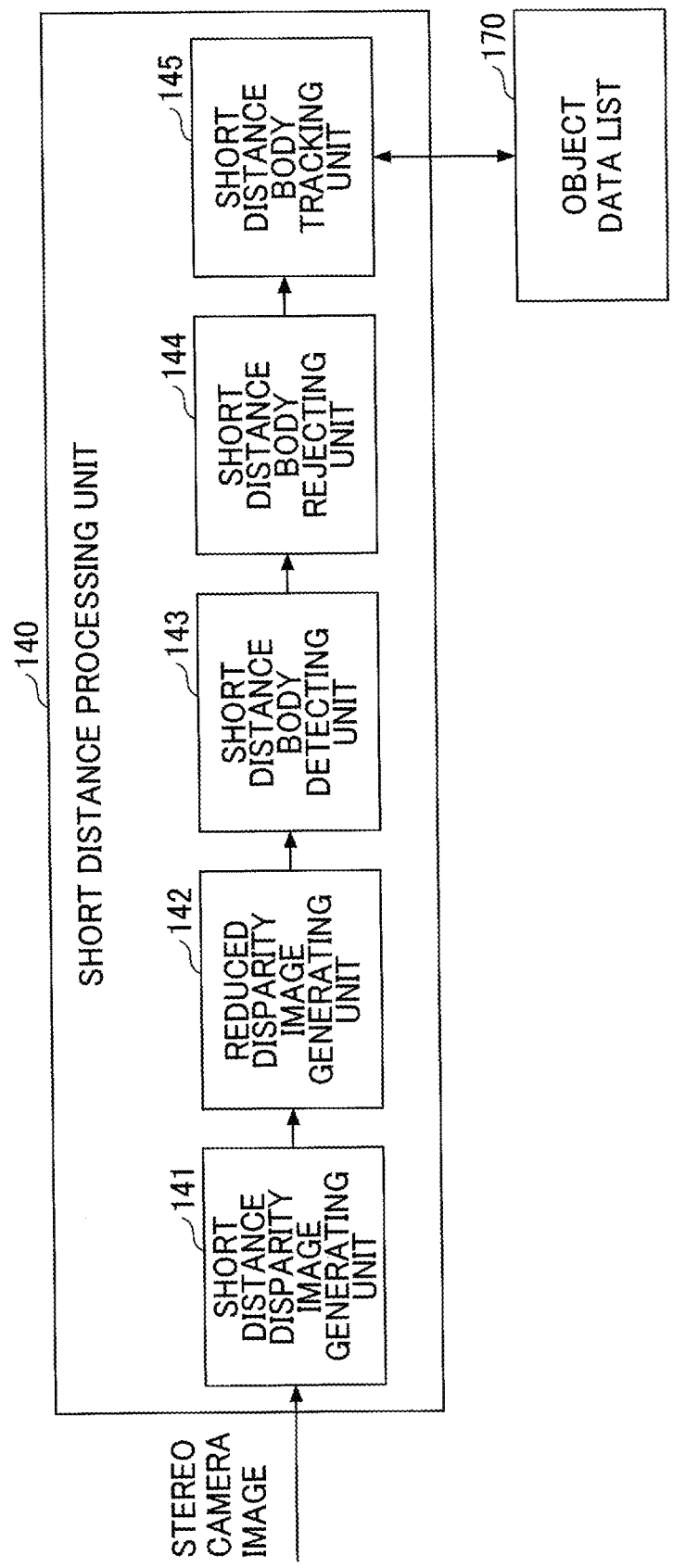
FIG. 5 is a functional block diagram of a short distance processing unit according to an embodiment of the present invention.

Next, with reference to FIG. 5, the functions of the short distance processing unit 140 will be described. FIG. 5 is a functional block diagram of the short distance processing unit 140. The short distance processing unit 140 performs detection and tracking of a body at a short distance (within a predetermined distance from the reference vehicle). The short distance processing unit 140 includes a short distance disparity image generating unit 141, a reduced disparity image generating unit 142, a short distance body detecting unit 143, a short distance body rejecting unit 144, and a short distance body tracking unit 145.

<<Short Distance Disparity Image Generating Process>>

For example, the short distance disparity image generating unit 141 can be implemented by the disparity computing unit 121 of the processing hardware unit 120.

The short distance disparity image generating unit 141 performs a short distance disparity image generating process for generating disparity image data (disparity image information) for a body positioned within a predetermined distance from the reference vehicle (stereo camera). In the short distance disparity image generating process, first, the luminance image data of one (imaging units 110a) of the two imaging units 110a and 110b is set as the reference image data, the luminance image data of the other imaging unit 110b is set as the comparison image data, and these pieces of image data are used to calculate the disparity with respect to a body positioned within a predetermined distance from the reference vehicle, and disparity image data is generated and output. This disparity image data indicates a disparity image in which pixel values corresponding to disparity values d calculated for the respective image portions in the reference image data, are expressed as pixel values of the respective image portions.

Specifically, the short distance disparity image generating unit 141 defines a block formed of a plurality of pixels (for example, 16 pixels×1 pixel) centered on one target pixel for a certain row of the reference image data. Then, in the same row in the comparison image data, the block having the same size as the block defined in the reference image data, is shifted pixel by pixel in the lateral line direction (x direction). In this case, in the short distance disparity image generating process, the range in which the block is shifted in the lateral line direction, is set to a range corresponding to a predetermined distance (for example, within 1 m to 6 m) from the reference vehicle. Accordingly, the disparity with respect to a body positioned within a predetermined distance from the reference vehicle is searched.

Then, the short distance disparity image generating unit 141 calculates a correlation value indicating the correlation between the feature amount indicating the feature of the pixel value of the block defined in the reference image data and the feature amount indicating the feature of the pixel value of each of the blocks in the comparison image data. Then, based on the calculated correlation value, a matching process is performed to select the block of comparison image data having the highest correlation with the block of the reference image data, among the blocks in the comparison image data. Subsequently, the positional deviation amount between the target pixel of the block of the reference image data and the corresponding pixel of the block of the comparison image data selected by the matching process, is calculated as the disparity value d. By performing such a process of calculating the disparity value d on the whole area or a specific area of the reference image data, the disparity image data can be obtained.

Furthermore, when performing the matching process described above, the short distance disparity image generating unit 141 determines whether there are a plurality of blocks for which the correlation value with the block of the reference image data is near the highest value (within a predetermined value from the highest value), among the blocks of the comparison image data. When there are a plurality of such blocks, the short distance disparity image generating unit 141 determines that a repeating pattern such as a fence has been detected, and sets a value indicating that the pattern is a repeating pattern, as the disparity value d.

For example, as the feature amount of the block used for the matching process, the value of each pixel (luminance value) in the block can be used. Furthermore, as the correlation value, for example, the total sum of the absolute values indicating the difference between the value of each pixel (luminance value) in the block of reference image data and the value of each pixel (luminance value) in the block of the comparison image data corresponding to each of the pixels of the reference image data, can be used. In this case, it can be said that the block having the smallest total sum has the highest correlation.

In the case where the matching process in the short distance disparity image generating unit 141 is implemented by hardware processing, for example, methods such as Sum of Squared Difference (SSD), Zero-mean Sum of Squared Difference (ZSSD), Sum of Absolute Difference (SAD), Zero-mean Sum of Absolute Difference (ZSAD), and Normalized Cross Correlation (NCC), etc., can be used. Note that in the matching process, only disparity values in units of pixels can be calculated, and therefore if a disparity value of a sub pixel level that is less than one pixel is required, it is necessary to use an estimated value. As an estimation method thereof, for example, an equiangular straight line method and a quadratic curve method, etc., can be used.

<<Reduced Disparity Image Generating Process>>

Next, the reduced disparity image generating unit 142 will be described. The reduced disparity image generating unit 142 extracts pixels at predetermined intervals from the disparity image with respect to a body positioned within a predetermined distance from the reference vehicle, generated by the short distance disparity image generating unit 141, thereby creating a reduced disparity image that has been reduced (less number of pixels). For example, when reducing a disparity image of 1280×640 pixels to 1/10 in the vertical and lateral directions, the reduced disparity image has 128×64 pixels.

When reducing the disparity image, the reduced disparity image generating unit 142 extracts pixels at regular intervals from the disparity image, and in the case where the disparity value of the extracted pixel is a value indicating infinity, or a value indicating an invalid value such as a value indicating a repeating pattern, the value of the extracted pixel is determined based on pixel values around the extracted pixel.

Figure 6:
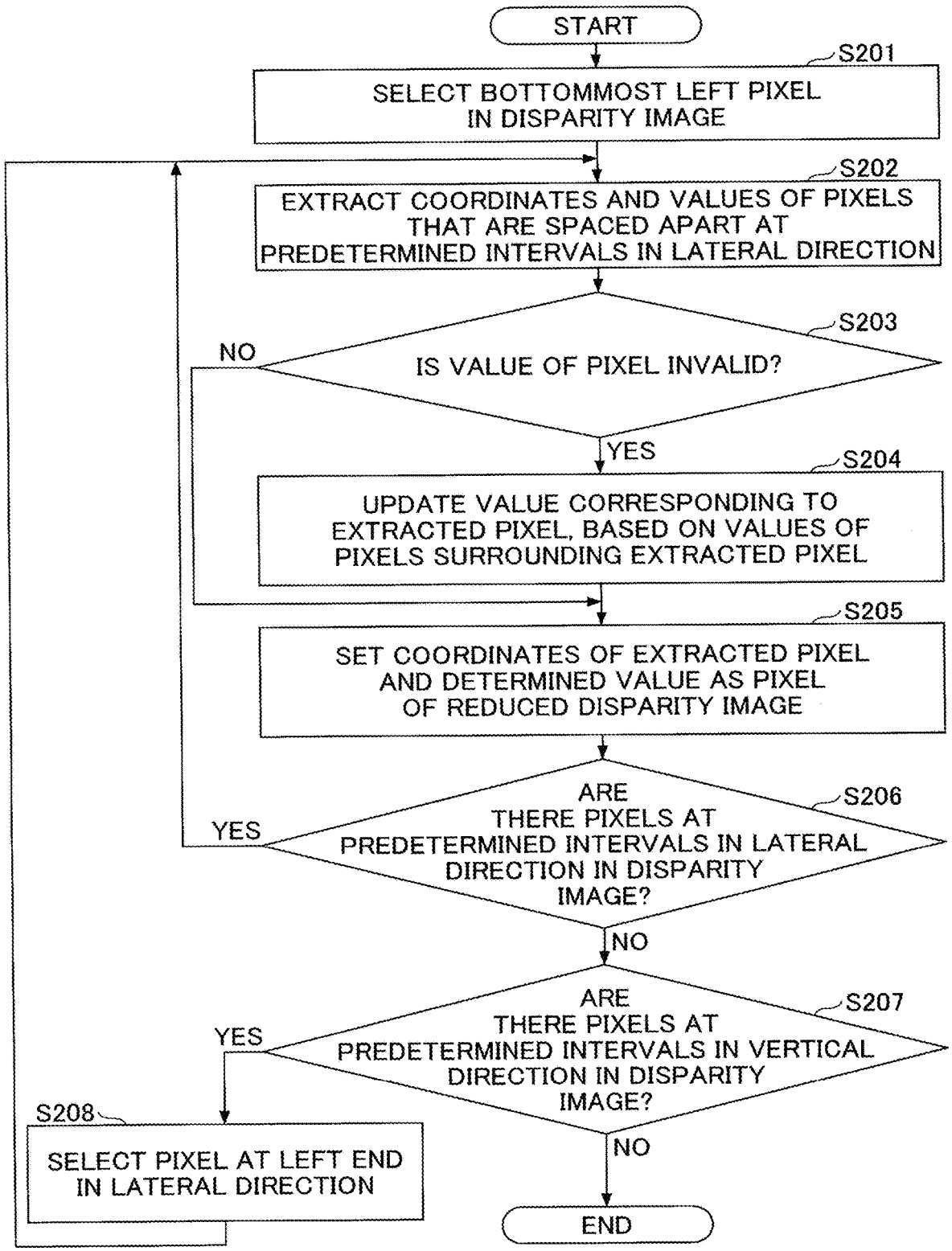
FIG. 6 is a flowchart illustrating an example of a reduced disparity image generating process according to an embodiment of the present invention.

Next, with reference to FIG. 6, the reduced disparity image generating process by the reduced disparity image generating unit 142 will be described. FIG. 6 is a flowchart illustrating an example of the reduced disparity image generating process.

The reduced disparity image generating unit 142 selects, for example, the pixel at the bottom left in the disparity image with respect to a body positioned within a predetermined distance from the reference vehicle (step S201).

Subsequently, the reduced disparity image generating unit 142 extracts the coordinates and the value (disparity value) of a pixel separated by a predetermined interval in the lateral direction from the position (coordinates) of the selected pixel (step S202).

Subsequently, the reduced disparity image generating unit 142 determines whether the disparity value of the extracted pixel is an invalid value (step S203).

When the disparity value of the extracted pixel is not an invalid value (NO in step S203), the process proceeds to step S205 to be described later.

When the disparity value of the extracted pixel is an invalid value (YES in step S203), the value for the extracted pixel is updated based on values of pixels surrounding the extracted pixel (step S204), and the extracted pixel is set as a pixel of the reduced disparity image (step S205).

Subsequently, the reduced disparity image generating unit 142 determines whether there is a pixel at a predetermined interval in the lateral direction in the disparity image (step S206).

When there is a pixel at a predetermined interval in the lateral direction (YES in step S206), the process proceeds to step S202.

When there is no pixel at a predetermined interval in the lateral direction (NO in step S206), the reduced disparity image generating unit 142 determines whether there is a pixel at a predetermined interval in the vertical direction (step S207).

When there is a pixel at a predetermined interval in the vertical direction (YES in step S207), for example, the reduced disparity image generating unit 142 selects the pixel on the left end in the lateral direction (step S208), and the process returns to step S202.

When there is no pixel at a predetermined interval in the vertical direction (NO in step S207), the process is terminated.

Figure 7:
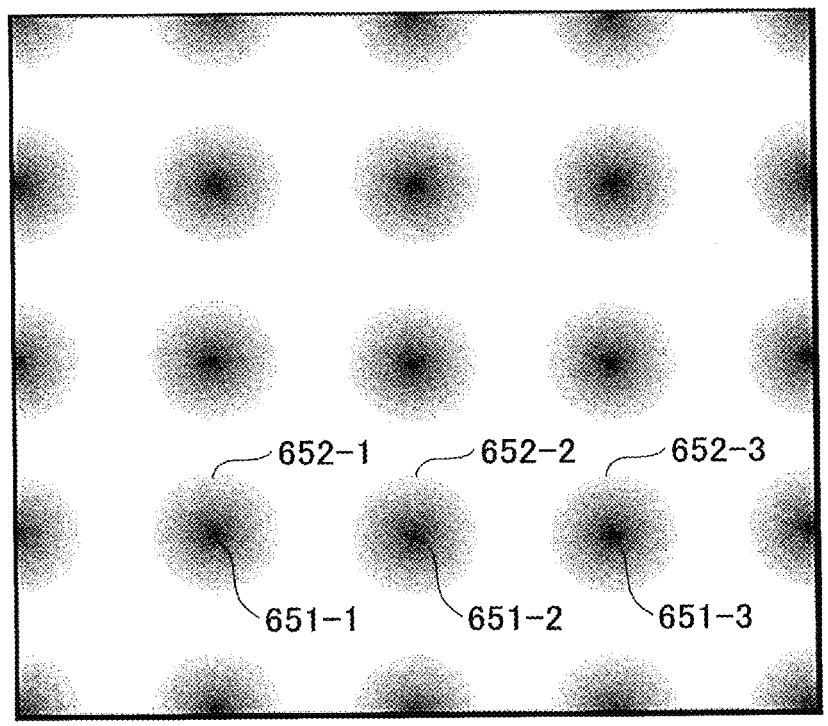
FIG. 7 is a diagram for describing the process of determining the value of an extracted pixel according to an embodiment of the present invention.

Next, with reference to FIG. 7, the process of determining the value of an extracted pixel by the reduced disparity image generating unit 142 will be described. FIG. 7 is a diagram for describing the process of determining the value of an extracted pixel. The reduced disparity image generating unit 142 extracts pixels 651-1 to 651-$n$ at regular intervals from the disparity image, and determines the values of the extracted pixels 651-1 to 651-$n$, based on values of pixels 652-1 to 652-$n$ surrounding each of the extracted pixels.

Figure 8:
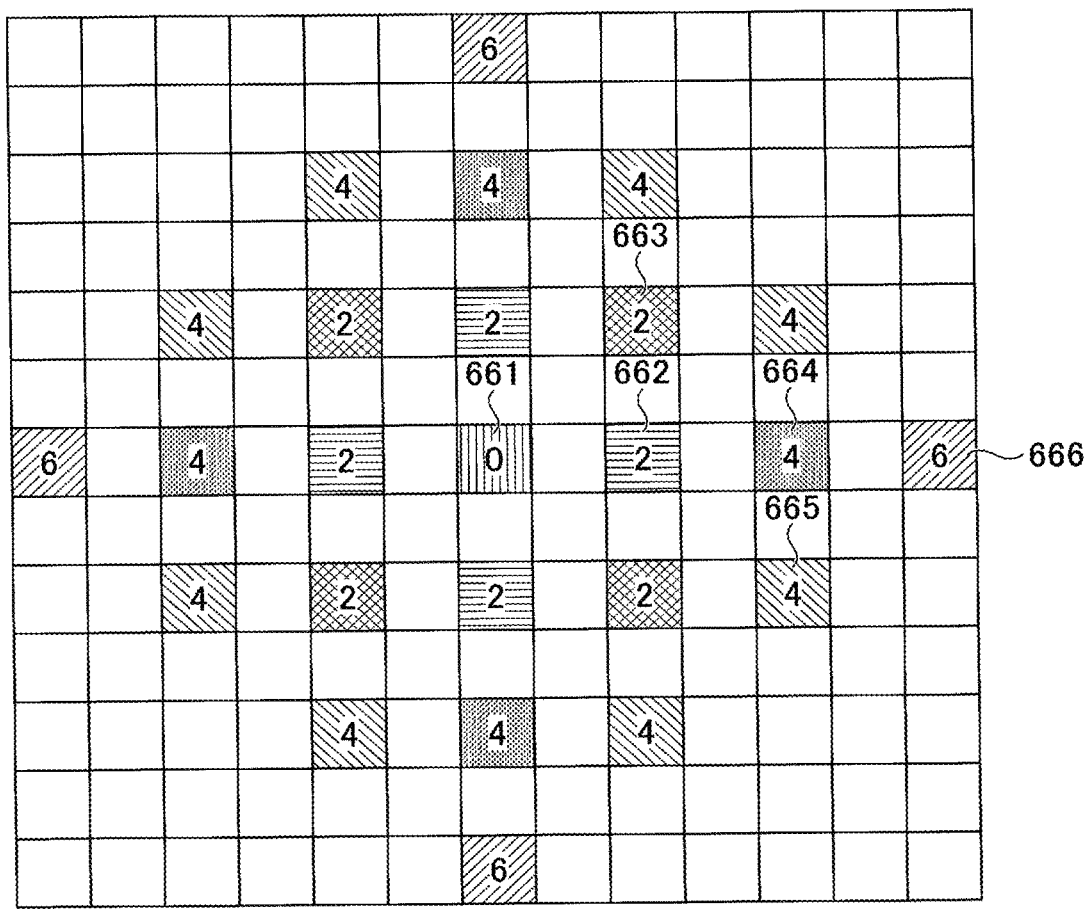
FIG. 8 is a diagram for describing an example of a process of determining the value of an extracted pixel according to an embodiment of the present invention.

Next, with reference to FIG. 8, an example of the process of determining the value of an extracted pixel by the reduced disparity image generating unit 142 will be described. FIG. 8 is a diagram for describing an example of a process of determining the value of an extracted pixel.

For example, the reduced disparity image generating unit 142 searches for pixels having valid values in a predetermined priority order around the extracted pixel, and when there is a pixel having a value that is not invalid (valid), the reduced disparity image generating unit 142 sets this value that is not invalid as the value of the extracted pixel.

As illustrated in FIG. 8, for example, the predetermined priority order may be an ascending order of nearness to an extracted pixel 661, among a group of predetermined pixels that are spaced apart by a predetermined length (pixels) from the extracted pixel 661. In the example of FIG. 8, pixels are searched in the priority order of four pixels 662 that are spaced apart by one pixel from the extracted pixel 661 in the top, bottom, left, and right directions, and then four pixels 663 that are spaced apart by one pixel from the extracted pixel 661 in the oblique directions, etc. Note that among the four pixels 662 at the same length from the extracted pixel 661, the order in which the pixels 662 are searched may be in any order, for example.

For example, the reduced disparity image generating unit 142 may set the average value of the extracted pixel and the surrounding pixels as the value of the extracted pixel.

Furthermore, when the short distance disparity image generating unit 141 detects a repeating pattern such as a fence, and the reliability as a disparity is low, the reduced disparity image generating unit 142 determines that the disparity value of the extracted pixel is an invalid value, and determines the value of the extracted pixel based on surrounding pixel values.

The reason for performing the process of determining the value of the extracted pixel based on the surrounding pixel values as described above, will be described below. When the disparity image is reduced, if pixels are simply extracted at regular intervals, there is a possibility of extracting only the pixels for which the disparity value of the body has not been calculated.

Figure 9A:
FIG. 9A is a diagram for describing a reference image and a disparity image according to an embodiment of the present invention.
Figure 9B:
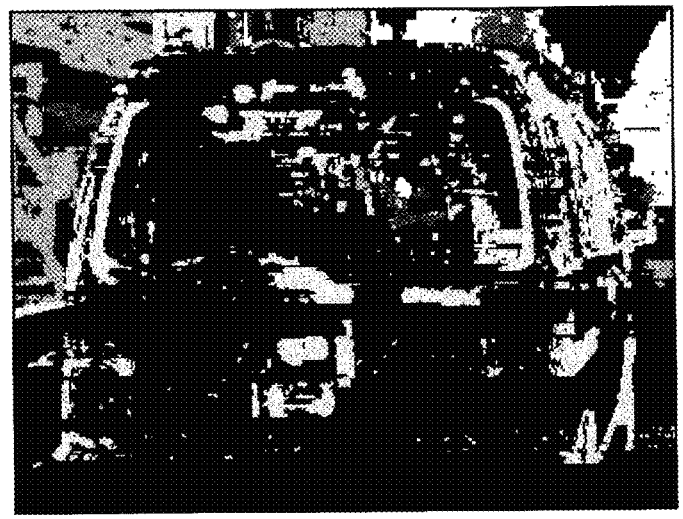
FIG. 9B is a diagram for describing a reference image and a disparity image according to an embodiment of the present invention.

The reason of extracting pixels, for which disparity values of a body have not been calculated, in an area where the body exists, will be described with reference to FIGS. 9A and 9B. FIGS. 9A and 9B are diagrams for describing a reference image and a disparity image. In the case of generating a disparity image with respect to an image of a preceding vehicle as illustrated in FIG. 9A, in the portions having the same color, the difference in luminance is small, and therefore the disparity value cannot be calculated; accordingly, the value often becomes an invalid value (for example, infinity). Thus, as illustrated in FIG. 9B, in the area where the preceding vehicle is appearing, the number of pixels having an invalid value indicated in black increases.

In FIG. 9B, when only pixels indicated in black are extracted, it may be determined that no body is present. Therefore, as described above, a process of supplementing the extracted pixel value is performed based on the surrounding pixel values.

<<Short Distance Body Detecting Process>>

The short distance body detecting unit 143 detects a body based on the reduced disparity image for a body positioned within a predetermined distance from the reference vehicle, generated by the reduced disparity image generating unit 142.

The short distance body detecting unit 143 calculates the actual distance from the reference vehicle to the body appearing in each pixel based on the disparity value of each pixel in the reduced disparity image, and applies the same label to adjacent pixels if the difference between the actual distances from the adjacent pixels to the reference vehicle is within a predetermined value (for example, 20 cm). Here, "adjacent" may be in four directions including up, down, left, and right, as well as in eight directions further including the upper right, the upper left, the lower right, and the lower left.

The short distance body detecting unit 143 detects a labeled unit (having the same label applied) as a single object. When the adjacent objects satisfy a predetermined joining condition, the short distance body detecting unit 143 detects the adjacent bodies as a single body. The predetermined joining condition is, for example, that "the adjacent objects each have one side in the longitudinal or lateral direction overlapping by half or more, and the difference between the actual lengths from the reference vehicle to the adjacent objects is less than 1 m", etc. Accordingly, it is possible to recognize an object positioned obliquely with respect to the traveling direction of the reference vehicle, such as a wall, as a single object.

The short distance body detecting unit 143 detects a rectangular or square area including the object in the reduced disparity image, as the area of the object.

<<Short Distance Body Rejecting Process>>

The short distance body rejecting unit 144 rejects (discards) the data of the object that is not a target of tracking, among the objects detected by the short distance body detecting unit 143.

The short distance body rejecting unit 144 calculates the size of the object based on the number of pixels in the vertical and lateral directions in the area of the object detected by the short distance body detecting unit 143, and the disparity values of the pixels included in the area. Then, the short distance body rejecting unit 144 compares the size of the object with a preset size of a person or a vehicle, and rejects (discards data of) an object that is too large (greater than or equal to a predetermined threshold value) or an object that is too small (less than a predetermined threshold value).

Furthermore, the short distance body rejecting unit 144 calculates the three-dimensional position of the object based on the positions (coordinates) of the pixels in the vertical and lateral directions in the area of the object and the disparity values of the pixels included in the area. Note that the method of calculating the three-dimensional position may be the same as the calculation method by a three-dimensional position determining unit 161 described later. Then, based on the previous frame (the image of the stereo camera), the short distance body rejecting unit 144 refers to the height of each road surface portion tabulated by a road surface height table calculating unit 154 to be described later, and rejects an object whose height is too high from the road surface (greater than or equal to a predetermined threshold value).

Furthermore, the short distance body rejecting unit 144 calculates the disparity density of the area of the object and rejects the object having a disparity density that is too low. Note that, for example, the disparity density is calculated by dividing (A/S) the number (A) of pixels having a disparity value corresponding to the object among the pixels included in the area of the object by the number of all pixels (S) included in the area including the object. Thereby, for example, when a bar at the entrance/exit of a parking lot is being raised at an inclination, it is possible to prevent a rectangular area including the bar from being determined as an obstacle.

<<Short Distance Body Tracking Process>>

The short distance body tracking unit 145 tracks an object detected by the short distance body detecting unit 143 and not rejected by the short distance body rejecting unit 144.

The short distance body tracking unit 145 refers to the object data list 170, and when the object detected by the short distance body detecting unit 143 is not stored in the object data list 170, the short distance body tracking unit 145 determines the object is a newly detected object, and stores the object in the object data list 170. When the detected object is stored in the object data list 170, the data for the object stored in the object data list 170 is updated to data based on the detected object.

Whether or not the detected object is stored in the object data list 170 is determined, for example, by determining whether the difference between the actual distance from the reference vehicle to the detected object and the actual distance from the reference vehicle to the object stored in the object data list 170, is less than or equal to a predetermined threshold value.

<Regular Distance Body Detecting Process>

Figure 10:
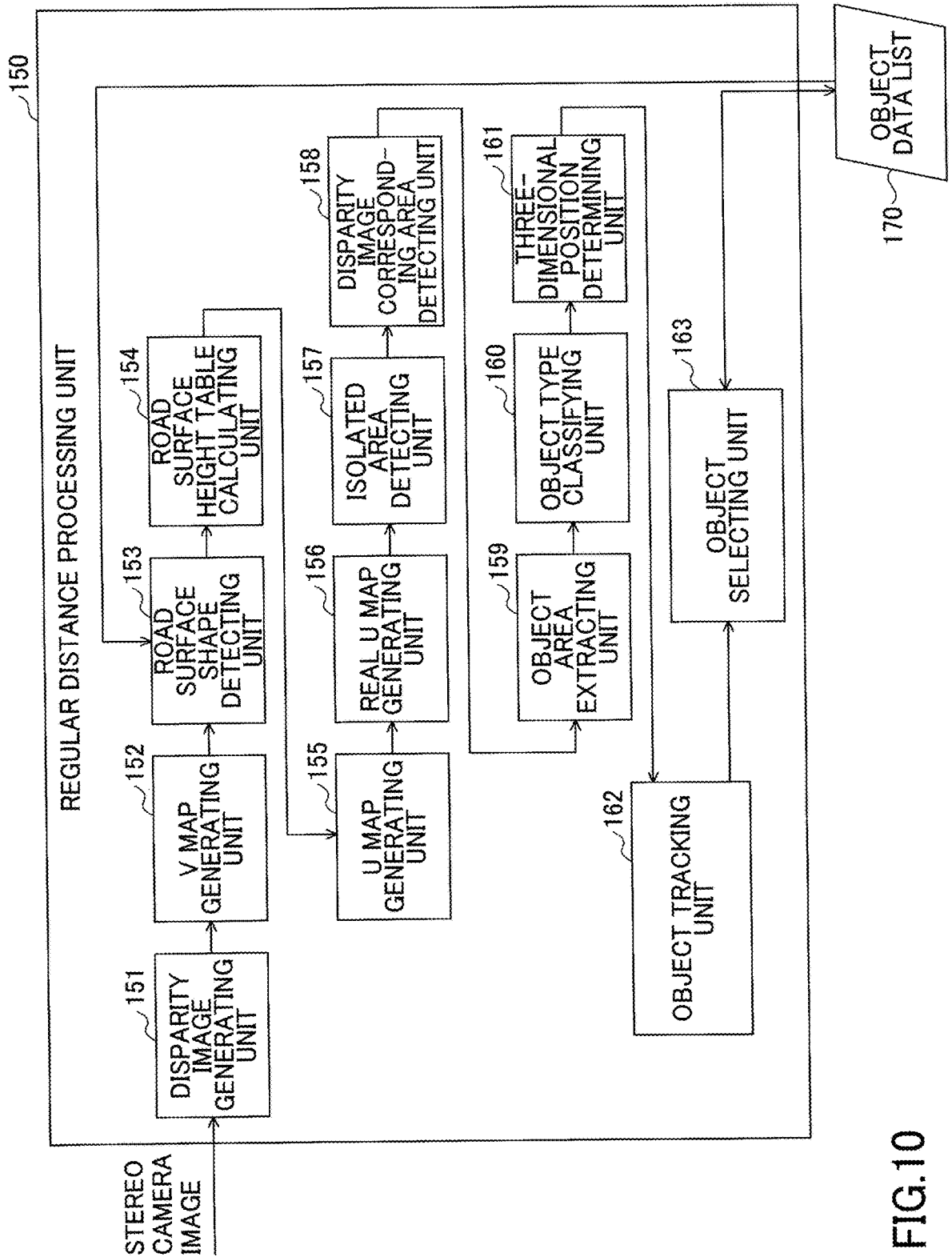
FIG. 10 is a functional block diagram of a regular distance processing unit according to an embodiment of the present invention.

Next, with reference to FIG. 10, the functions of the regular distance processing unit 150 in FIG. 4 will be described. FIG. 10 is a functional block diagram of the regular distance processing unit 150. The regular distance processing unit 150 performs detection and tracking of a body at a regular distance that is greater than or equal to a predetermined distance (for example, 2 m) from the reference vehicle.

<<Disparity Image Generating Process>>

For example, a disparity image generating unit 151 may be implemented by the disparity computing unit 121 of the processing hardware unit 120.

The disparity image generating unit 151 performs a disparity image generation process of generating disparity image data (disparity image information) with respect to a body positioned in a range farther than the above-described short distance disparity image generating unit 141 (for example, approximately 2 m to 80 m from the reference vehicle).

This disparity image generation process is similar to the above-described short distance disparity image generating process by the short distance disparity image generating unit 141; however, in this disparity image generation process, for example, the following is different from the short distance disparity image generating process. When shifting the blocks defined in the reference image data in the lateral line direction in the same row in the comparison image data, the disparity image generating unit 151 sets the range in which the blocks are shifted in the lateral line direction, to be within a predetermined distance from the reference vehicle (for example, 2 m to 80 m). Accordingly, the disparity with respect to a body positioned at a relatively long distance from the reference vehicle is searched.

<<V Map Generating Process>>

After performing the disparity image supplementing process, next, a V map generating unit 152 executes a V map generating process for generating a V map. Each piece of disparity pixel data included in the disparity image data is indicated by a set (x, y, d) of the x direction position, the y direction position, and the disparity value d. This is transformed into three-dimensional coordinate information (d, y, f) in which d is on the X axis, y is on the Y axis, and the frequency f is on the Z axis, or this three-dimensional coordinate information (d, y, f) is limited to three-dimensional coordinate information (d, y, f) exceeding a predetermined frequency threshold value, to generate disparity histogram information. The disparity histogram information according to the present embodiment is formed of three-dimensional coordinate information (d, y, f), and information obtained by distributing this three-dimensional histogram information onto an X-Y two-dimensional coordinate system, is referred to as a V map (disparity histogram map, V-disparity map).

More specifically, the V map generating unit 152 calculates a disparity value frequency distribution for each row area of the disparity image data obtained by dividing the image into a plurality of parts in the vertical direction. The information indicating the disparity value frequency distribution is the disparity histogram information.

Figure 11A:
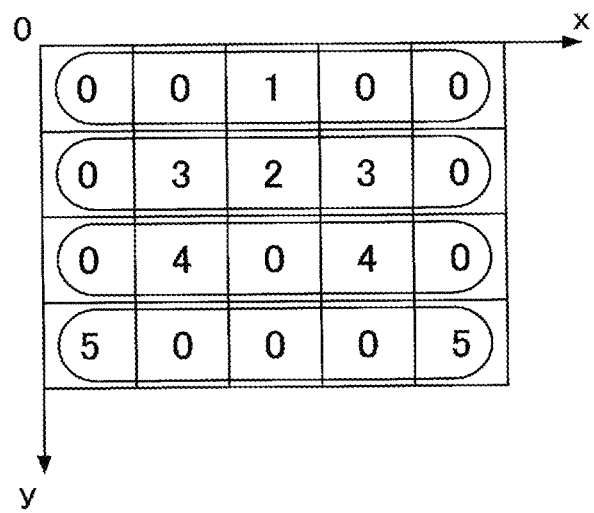
FIG. 11A is a diagram for describing disparity image data and a V map generated from the disparity image data according to an embodiment of the present invention.
Figure 11B:
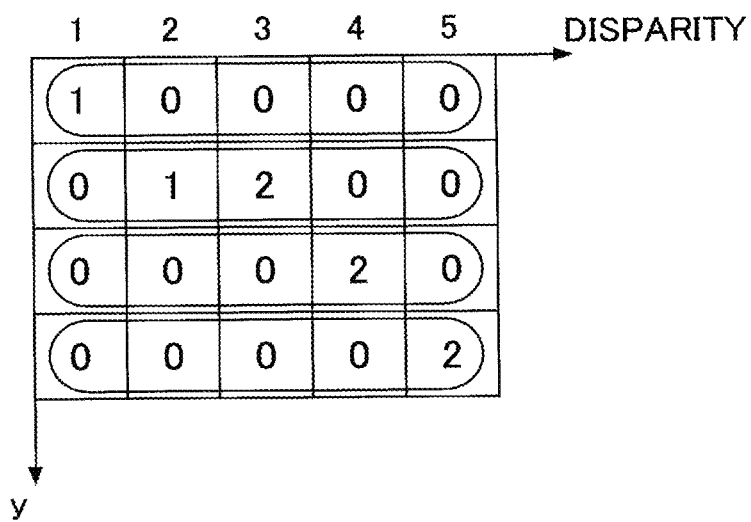
FIG. 11B is a diagram for describing disparity image data and a V map generated from the disparity image data according to an embodiment of the present invention.

FIGS. 11A and 11B are diagrams for describing the disparity image data and a V map generated from the disparity image data. Here, FIG. 11A is a diagram illustrating an example of the disparity value distribution of the disparity image, and FIG. 11B is a diagram illustrating a V map indicating the disparity value frequency distribution for each row of the disparity image in FIG. 11A.

When disparity image data having a disparity value distribution as illustrated in FIG. 11A is input, the V map generating unit 152 calculates a disparity value frequency distribution that is a distribution of the number of pieces of data of disparity values for each row, and outputs the calculation result as disparity histogram information. Information of the disparity value frequency distribution of each row obtained in this manner is expressed on a two-dimensional orthogonal coordinate system, in which the y-direction positions (vertical positions in the captured image) in the disparity image is taken on the Y-axis and the disparity values are taken on the X-axis, thereby obtaining a V map as illustrated in FIG. 11B. The V map can be expressed as an image in which pixels having pixel values according to the frequency f are distributed on a two-dimensional orthogonal coordinate system.

Figure 12A:
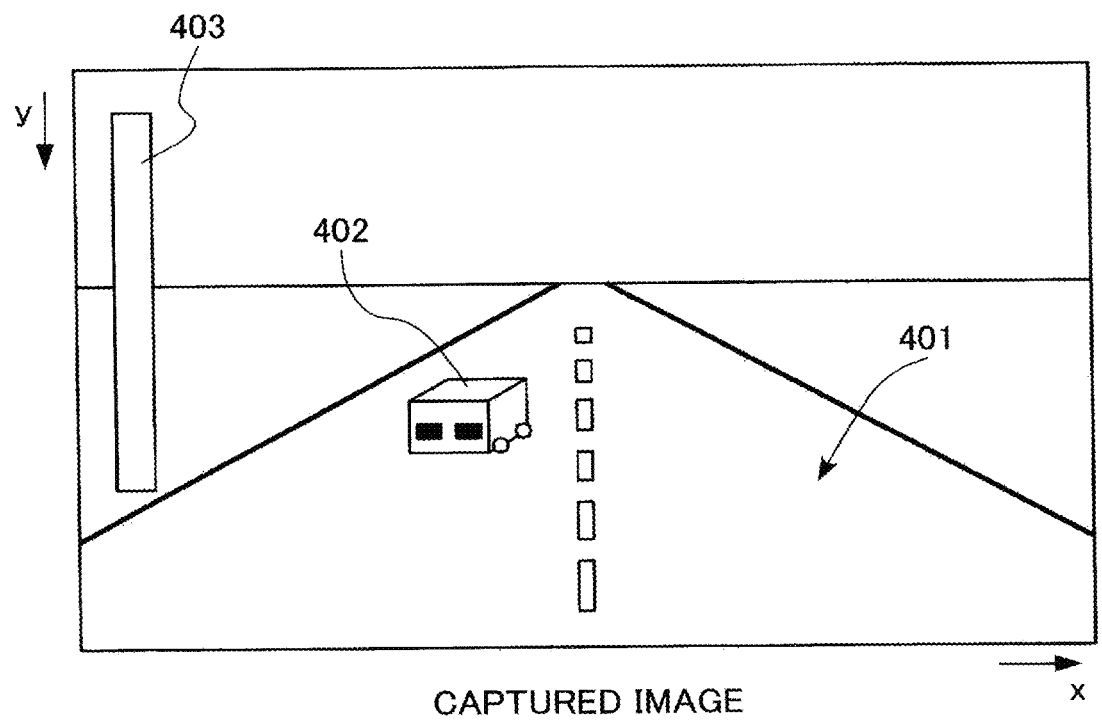
FIG. 12A is a diagram illustrating an example of an image of a captured image as a reference image captured by one of the imaging units and a V map corresponding to the captured image according to an embodiment of the present invention.
Figure 12B:
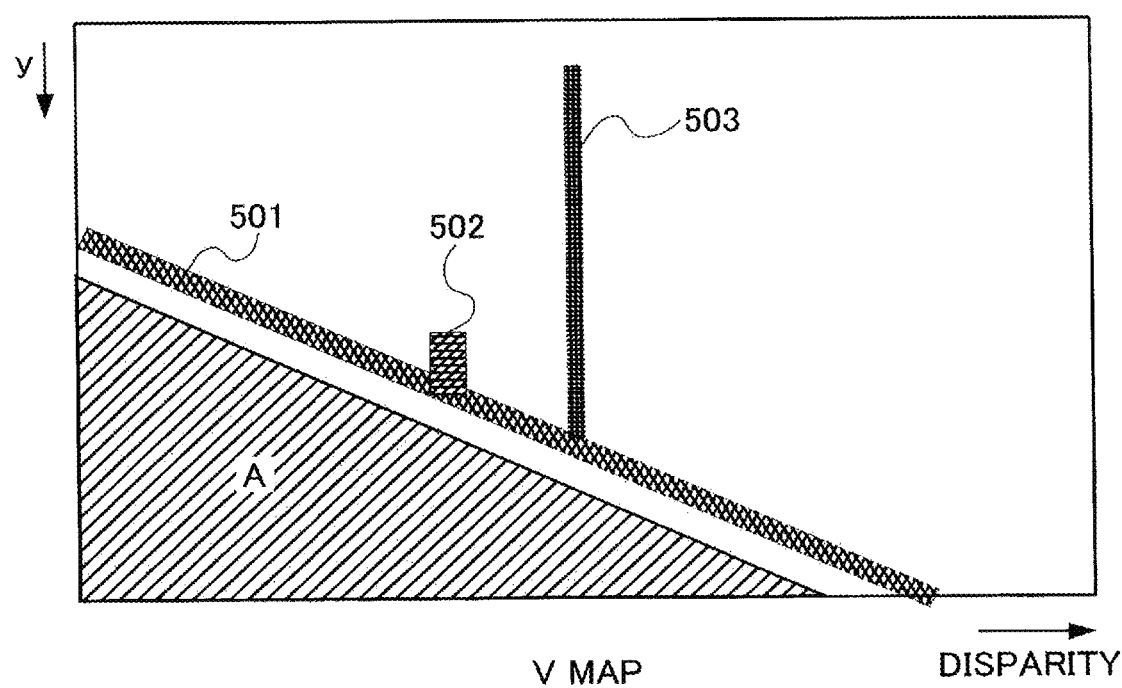
FIG. 12B is a diagram illustrating an example of an image of a captured image as a reference image captured by one of the imaging units and a V map corresponding to the captured image according to an embodiment of the present invention.

FIGS. 12A and 12B are diagrams illustrating an example of an image of a captured image as a reference image captured by one of the imaging units, and a V map corresponding to the captured image. Here, FIG. 12A is a captured image, and FIG. 12B is a V map. That is, the V map illustrated in FIG. 12B is generated from the captured image as illustrated in FIG. 12A. In the V map, no disparity is detected in the area below the road surface, and therefore the disparity is not counted in the area A indicated by slanted lines.

In the image example illustrated in FIG. 12A, a road surface 401 on which the reference vehicle is traveling, a preceding vehicle 402 existing in front of the reference vehicle, and a utility pole 403 existing outside the road, are displayed. Furthermore, the V map illustrated in FIG. 12B includes a road surface 501, a preceding vehicle 502, and a utility pole 503 corresponding to the image example.

This image is an example in which a road surface in front of the reference vehicle relatively matches a flat road surface, that is, the road surface in front of the reference vehicle matches a virtual reference road surface (virtual reference movement surface) obtained by extending a surface, which is parallel to the road surface portion directly below the reference vehicle, in front of the reference vehicle. In this case, in the lower part of the V map corresponding to the lower part of the image, the high frequency points are distributed in a substantially linear manner with an inclination such that the disparity value d becomes smaller toward the upper part of the image. Pixels indicating such a distribution are pixels that display an identification target that is present at substantially the same distance in each row in the disparity image, that has the highest occupancy rate, and that is continuously farther away toward the upper part of the image.

The imaging unit 110a captures the area in front of the reference vehicle, and therefore in the content of the captured image, the disparity value d of the road surface decreases towards the upper part of the image, as in FIG. 12B. Furthermore, in the same row (lateral line), the pixels displaying the road surface have substantially the same disparity value d. Accordingly, the above-described high frequency points distributed in a substantially linear manner on the V map, correspond to the features of the pixels that display the road surface (movement surface). Therefore, it is possible to estimate, with high accuracy, that the pixels of points, which are distributed on or near an approximate straight line obtained by linearly approximating the high frequency points on the V map, are pixels displaying the road surface. Furthermore, the distance to the road surface portion displayed in each pixel can be obtained with high accuracy from the disparity value d of the corresponding point on the approximate straight line.

<<Road Surface Shape Detection Process>>

Next, in the present embodiment, the road surface shape detecting unit 153 executes a road surface shape detection process of detecting the three-dimensional shape of the road surface in front of the reference vehicle 100, from the information (disparity histogram information) of the V map generated by the V map generating unit 152.

In the image example illustrated in FIG. 12A, the road surface 401 on which the reference vehicle 100 is traveling, the preceding vehicle 402 existing in front of the reference vehicle 100, and the utility pole 403 existing outside the road, are displayed. This image is an example in which a road surface in front of the reference vehicle 100 relatively matches a flat road surface, that is, the road surface in front of the reference vehicle 100 matches a virtual reference road surface (virtual reference movement surface) obtained by extending the surface, which is parallel to the road surface portion directly below the reference vehicle, in front of the reference vehicle. In this case, in the lower part of the V map corresponding to the lower part of the image, the high frequency points (road surface 501) are distributed in a substantially linear manner with an inclination such that the disparity value d becomes smaller toward the upper part of the image. Pixels indicating such a distribution are pixels that display a detection target that is present at substantially the same distance in each row in the disparity image, that has the highest occupancy rate, and that is continuously farther away toward the upper part of the image.

The imaging unit 110*a* captures the area in front of the reference vehicle, and therefore in the content of the captured image, the disparity value d of the road surface decreases towards the upper part of the image, as in FIG. 12B. Furthermore, in the same row (lateral line), the pixels displaying the road surface have substantially the same disparity value d. Accordingly, the above-described high frequency points (road surface 501) distributed in a substantially linear manner on the V map, correspond to the features of the pixels that display the road surface (movement surface). Therefore, it is possible to estimate, with high accuracy, that the pixels of points, which are distributed on or near an approximate straight line obtained by linearly approximating the high frequency points on the V map, are pixels displaying the road surface. Furthermore, the distance to the road surface portion displayed in each pixel can be obtained with high accuracy from the disparity value d of the corresponding point on the approximate straight line.

<<Road Surface Height Table Calculating Process>>

Next, the road surface height table calculating unit 154 performs a road surface height table calculating process of calculating the road surface height (the relative height with respect to the road surface portion directly under the reference vehicle) and tabulating the road surface height. From the information of the approximate straight line on the V map generated by a road surface shape detecting unit 153, it is possible to calculate the distance to each road surface portion displayed in each row area (each position in the vertical direction of the image) in the captured image. On the other hand, it is determined in advance as to where each surface portion in the traveling direction of the reference vehicle of the virtual plane, which is obtained by extending the road surface portion positioned directly under the vehicle to the front in the traveling direction of the vehicle so as to be parallel to the road surface portion, is displayed in which row area of the captured image, and this virtual plane (reference road surface) is represented by a straight line (reference straight line) on the V map. By comparing the approximate straight line output from the road surface shape detecting unit 153 with the reference straight line, it is possible to obtain the height of each road surface portion in front of the reference vehicle. Simply, it is possible to calculate the height of the road surface portion existing in front of the reference vehicle by a distance obtained from a corresponding disparity value, from the Y axis position on the approximate straight line output from the road surface shape detecting unit 153. The road surface height table calculating unit 154 tabulates the height of each road surface portion obtained from the approximate straight line, with respect to the necessary disparity range.

Note that the height from the road surface to a body, which is displayed in the captured image portion corresponding to the point where the Y axis position is y' at a certain disparity value d, can be calculated from (y'−y0), assuming that y0 is the Y axis position on an approximate straight line at the disparity value d. In general, the height H from the road surface to a body corresponding to the coordinates (d, y') on the V map, can be calculated from the following formula [2]. In the following formula [2], "z" is the distance (z=BF/(d−offset)) calculated from the disparity value d, and "f" is a value obtained by converting the focal length of the camera to the same units as the units of (y'−y0). Here, "BF" is a value obtained by multiplying the baseline length by the focal length of the stereo camera, and "offset" is the disparity value when a body at infinity is photographed.

$$H = z \times (y'-y0)/f \quad \text{Formula [2]}$$

<<U Map Generating Process>>

Next, a U map generating unit 155 executes a frequency U map generating process and a height U map generating process as a U map generating process for generating a U map (U-disparity map).

In the frequency U map generating process, a set (x, y, d) of the x direction position, the y direction position, and the disparity value d in each piece of disparity pixel data included in the disparity image data, is set such that x is on the X axis, d is on the Y axis, and the frequency is on the Z axis, thereby creating X-Y two-dimensional histogram information. This is referred to as a frequency U map. The U map generating unit 155 according to the present embodiment creates a frequency U map with respect to only a point (x, y, d) in the disparity image for which the height H from the road surface is within a predetermined height range (for example, from 20 cm to 3 m), based on the height of each road surface portion tabulated by the road surface height calculating unit 154. In this case, it is possible to appropriately extract the body existing in the predetermined height range from the road surface.

Furthermore, in the height U map generating process, the set (x, y, d) of the x direction position, the y direction position, and the disparity value d in each piece of disparity pixel data included in the disparity image data, is set such that x is on the X axis, d is on the Y axis, and the height from the road surface is on the Z axis, thereby creating X-Y two-dimensional histogram information. This is referred to as a height U map. The value of the height at this time is the highest height from the road surface.

Figure 13:
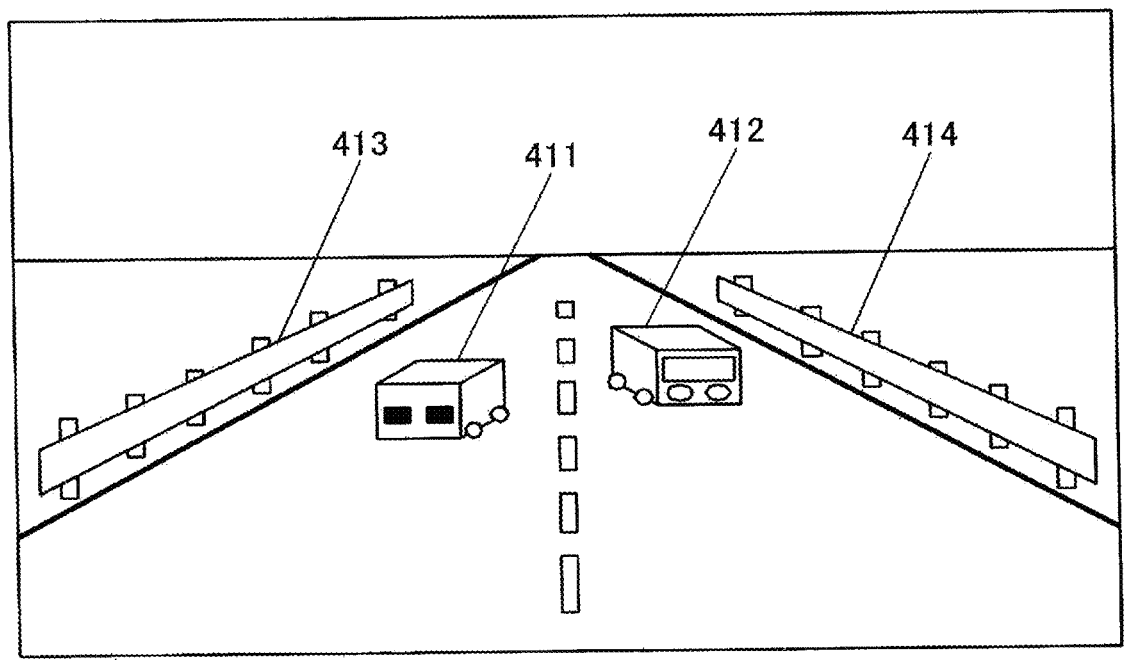
FIG. 13 is a diagram illustrating an example of an image schematically illustrating an example of a reference image according to an embodiment of the present invention.
Figure 14A:
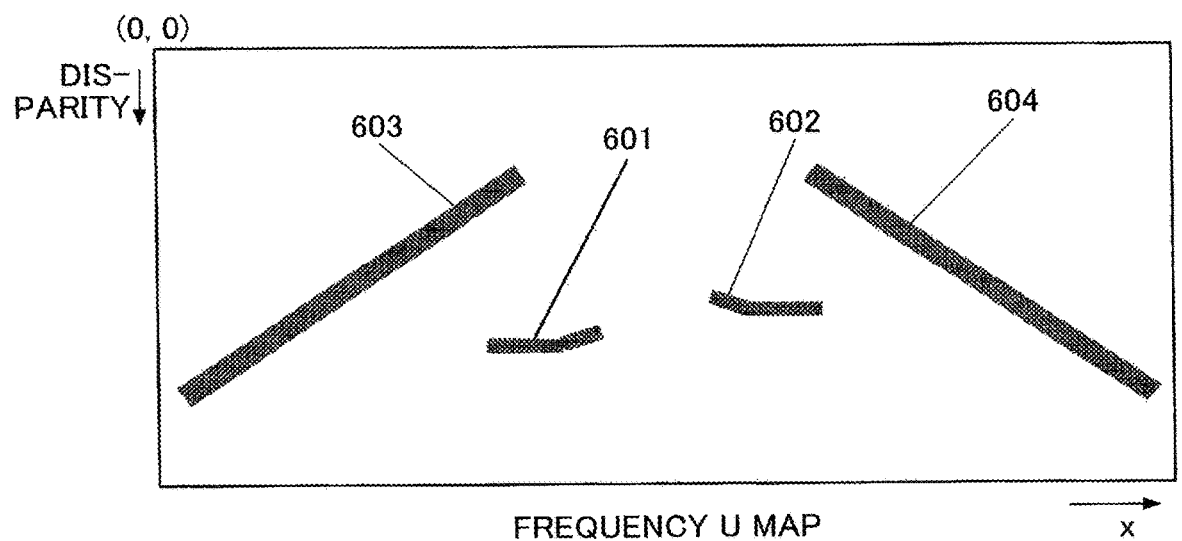
FIG. 14A is a diagram illustrating a U map corresponding to an example of an image according to an embodiment of the present invention.
Figure 14B:
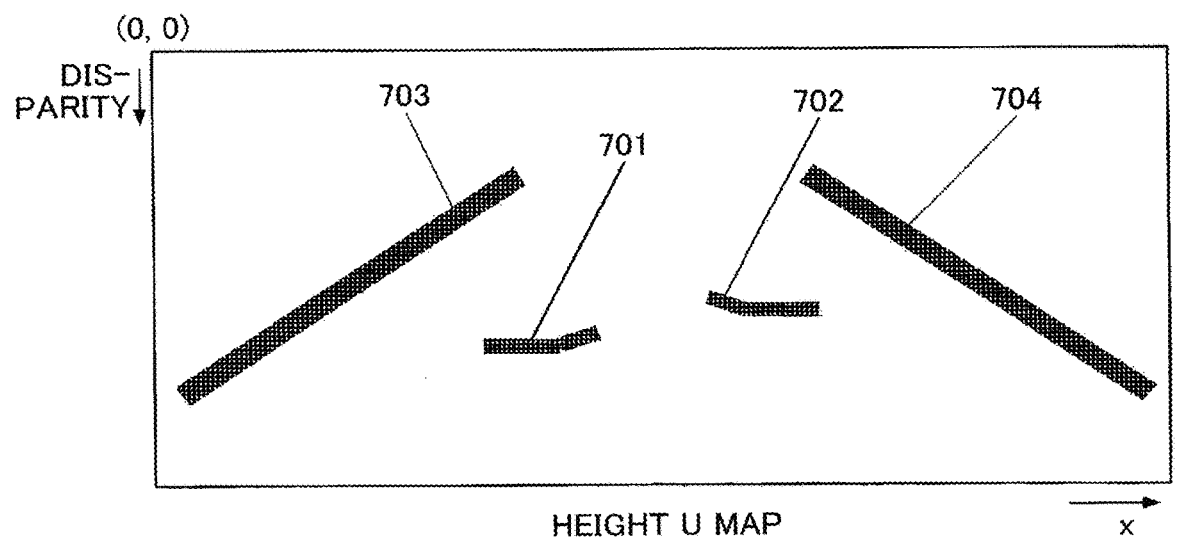
FIG. 14B is a diagram illustrating a U map corresponding to an example of an image according to an embodiment of the present invention.

FIG. 13 is an example of an image that schematically illustrates an example of a reference image captured by the imaging unit 110a, and FIGS. 14A and 14B illustrate U maps corresponding to the image example of FIG. 13. Here, FIG. 14A illustrates a frequency U map, and FIG. 14B illustrates a height U map.

In the image example illustrated in FIG. 13, guardrails 413 and 414 are present on the left and right sides of the road surface, and as other vehicles, there is a preceding vehicle 411 and an oncoming vehicle 412. In this case, in the frequency U map, as illustrated in FIG. 14A, high frequency points corresponding to the left and right guardrails 413 and 414 are distributed in substantially linear shapes 603 and 604 extending upward from the left and right end sides toward the center. On the other hand, high frequency points corresponding to the preceding vehicle 411 and the oncoming vehicle 412 are distributed in the states of line segments 601 and 602 extending in parallel in the substantially X axis direction, between the right and left guardrails. Note that in a situation where side portions of these vehicles are displayed, in addition to the rear portion of the preceding vehicle 411 or the front portion of the oncoming vehicle 412, a disparity arises within the image area displaying the same other vehicles. In such a case, as illustrated in FIG. 15A, the high frequency points corresponding to the other vehicles indicate a distribution of a state in which a line segment extending in parallel to the substantially X axis direction and a line segment tilted with respect to the substantially X axis direction are connected.

Furthermore, in the height U map, points having the highest heights from the road surface in the left and right guardrails 413 and 414, the preceding vehicle 411, and the oncoming vehicle 412 are distributed in the same manner as the frequency U map. Here, the heights of a distribution 701 of points corresponding to the preceding vehicle and a distribution 702 of points corresponding to the oncoming vehicle, are higher than distributions 703 and 704 of points corresponding to the guardrails. Accordingly, the height information of a body in the height U map can be used for body detection.

<<Real U Map Generating Process>>

Next, a real U map generating unit 156 will be described. The real U map generating unit 156 executes a real frequency U map generating process and a real height U map generating process, as the U map generating process for generating a real U map (Real U-disparity map) (an example of "distribution data").

In the real U map, the lateral axis in the U map is converted from the pixel unit of the image to the actual distance, and the disparity value on the vertical axis is converted into a thinned disparity having a thinning rate according to the distance.

In the real frequency U map generating process, the real U map generating unit 156 sets the set (x, y, d) of the x direction position, the y direction position, and the disparity value d in each piece of disparity pixel data included in the disparity image data, such that an actual distance in the horizontal direction is on the X axis, a thinned disparity is on the Y axis, and the frequency is on the Z axis, to create X-Y two-dimensional histogram information. Note that similar to the U map generating unit 155, the real U map generating unit 156 according to the present embodiment creates a real frequency U map only for the points (x, y, d) in the disparity image for which the height from the road surface is within a predetermined height range, based on the height of each road surface portion tabulated by the road surface height table calculating unit 154. Note that the real U map generating unit 156 may generate a real U map based on the U map generated by the U map generating unit 155.

Figure 15:
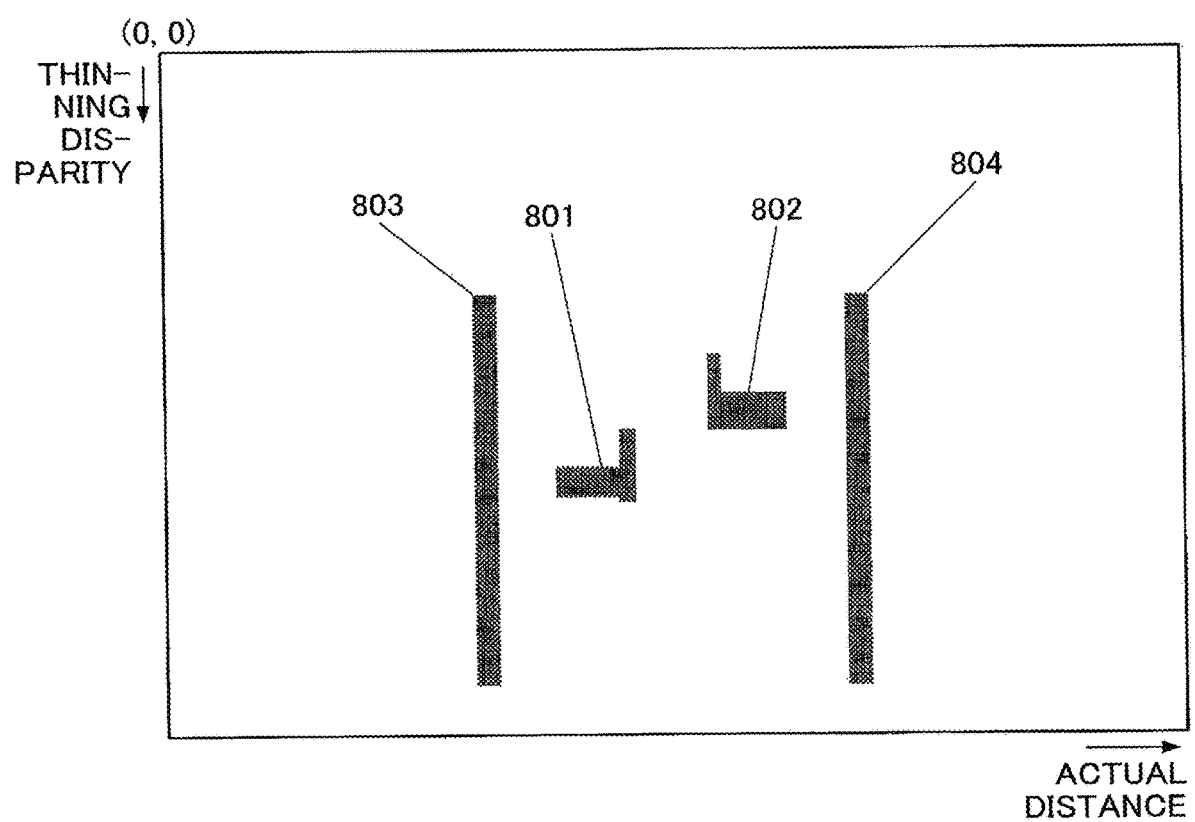
FIG. 15 is a diagram illustrating a real U map corresponding to a U map according to an embodiment of the present invention.

FIG. 15 is a diagram illustrating a real U map (hereinafter referred to as a "real frequency U map") corresponding to the frequency U map illustrated in FIG. 14A. As illustrated in the figure, the left and right guardrails are represented by vertical linear patterns 803 and 804, and the preceding vehicle and the oncoming vehicle are also represented by patterns 801 and 802 close to the actual shapes.

The thinned disparity on the vertical axis is not thinned with respect to a long distance (here, 50 m or more), but is thinned to ½ with respect to a medium distance (20 m or more, less than 50 m), thinned to ⅓ with respect to a short distance (10 m or more, less than 20 m), and thinned to ⅛ with respect to a very close range (less than 10 m).

That is, the larger the distance, the smaller the amount of thinning. The reason is that a body appears small in size at a faraway location, and therefore there is less disparity data, and the distance resolution is also low, and accordingly, the thinning is reduced. Conversely, the body appears large in size at a short distance, and therefore there is more disparity data, and the distance resolution is high, and accordingly, thinning is increased.

Figure 16:
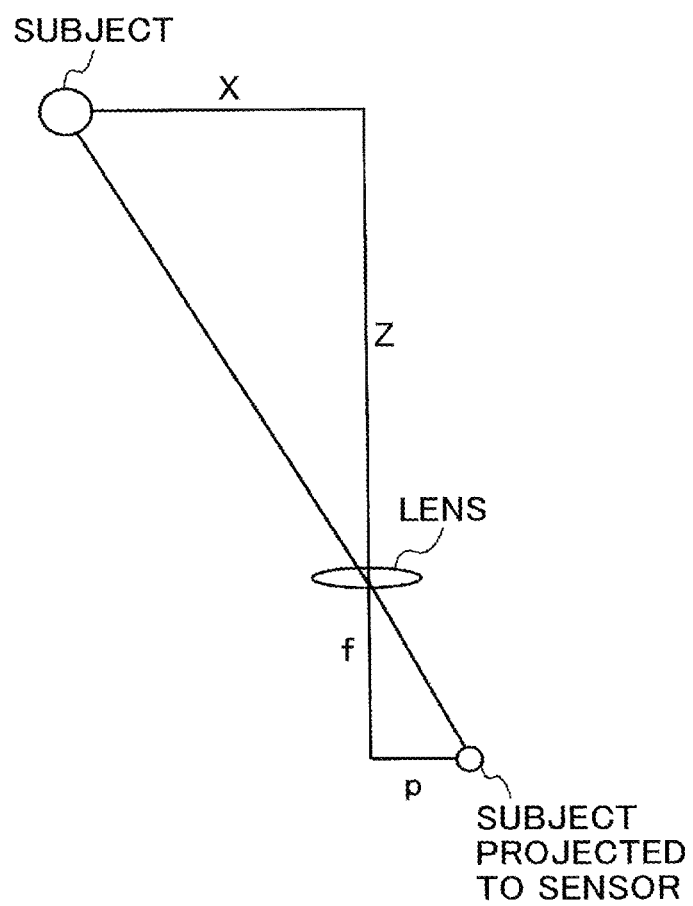
FIG. 16 is a diagram for describing a method of obtaining a value on the horizontal axis of the real U map from a value on the horizontal axis of the U map according to an embodiment of the present invention.

Examples of a method of converting the lateral axis from pixel units of an image to an actual distance and a method of obtaining (X, d) of the real U map from (x, d) of the U map, will be described with reference to FIG. 16.

As the object detection range, a width of 10 m to the left and right from the camera, that is, 20 m is set. Assuming that the width of one pixel in the lateral direction of the real U map is 10 cm, the lateral size of the real U map is 200 pixels.

It is assumed that the focal length of the camera is f, the lateral position of the sensor from the camera center is p, the distance from the camera to the subject is Z, and the lateral position from the camera center to the subject is X. Assuming that the pixel size of the sensor is s, the relationship between x and p is expressed as "x=p/s". Furthermore, from the characteristics of the stereo camera, there is a relationship of "Z=Bf/d".

Furthermore, as illustrated in the figure, there is a relationship of "x=p*Z/f", and therefore the relationship of "X=s×B/d" can be expressed. Although X is the actual distance, the width of one pixel in the lateral direction on the real U map is 10 cm, and therefore it is possible to easily calculate the position of X on the real U map.

A real U map (hereinafter referred to as real height U map) corresponding to the height U map illustrated in FIG. 14B can also be created by the same procedure.

In the real U map, the vertical and lateral lengths can be made smaller than the U map, and therefore it is beneficial that the processing becomes faster. Furthermore, the lateral direction is independent of distance, and therefore it is beneficial that it is possible to detect the same body by the same width in both the far and nearby areas, and it is possible to easily determine the processing branching towards surrounding area removal, lateral separation, and vertical separation (width threshold value processing) at a subsequent stage.

The vertical length in the U map is determined by how many meters the shortest measurable distance will be. That is, "d=Bf/Z" is satisfied, and therefore the maximum value of d is determined according to the shortest measurable Z. Furthermore, the disparity value d handles a stereo camera image, and therefore the disparity value d is usually calculated in pixel units; however, a decimal number is included, and therefore the disparity value is multiplied by a predetermined value and the decimal part is rounded off to obtain an integer, and this integer is used as the disparity value.

When the shortest measurable Z becomes ½, d is doubled, and therefore the U map data becomes enormous accordingly. Therefore, when creating a real U map, data is compressed by thinning pixels as the distance becomes shorter, and the data amount is reduced as compared with the U map. Therefore, object detection by labeling can be performed at high speed.

<<Isolated Area Detection>>

Figure 17:
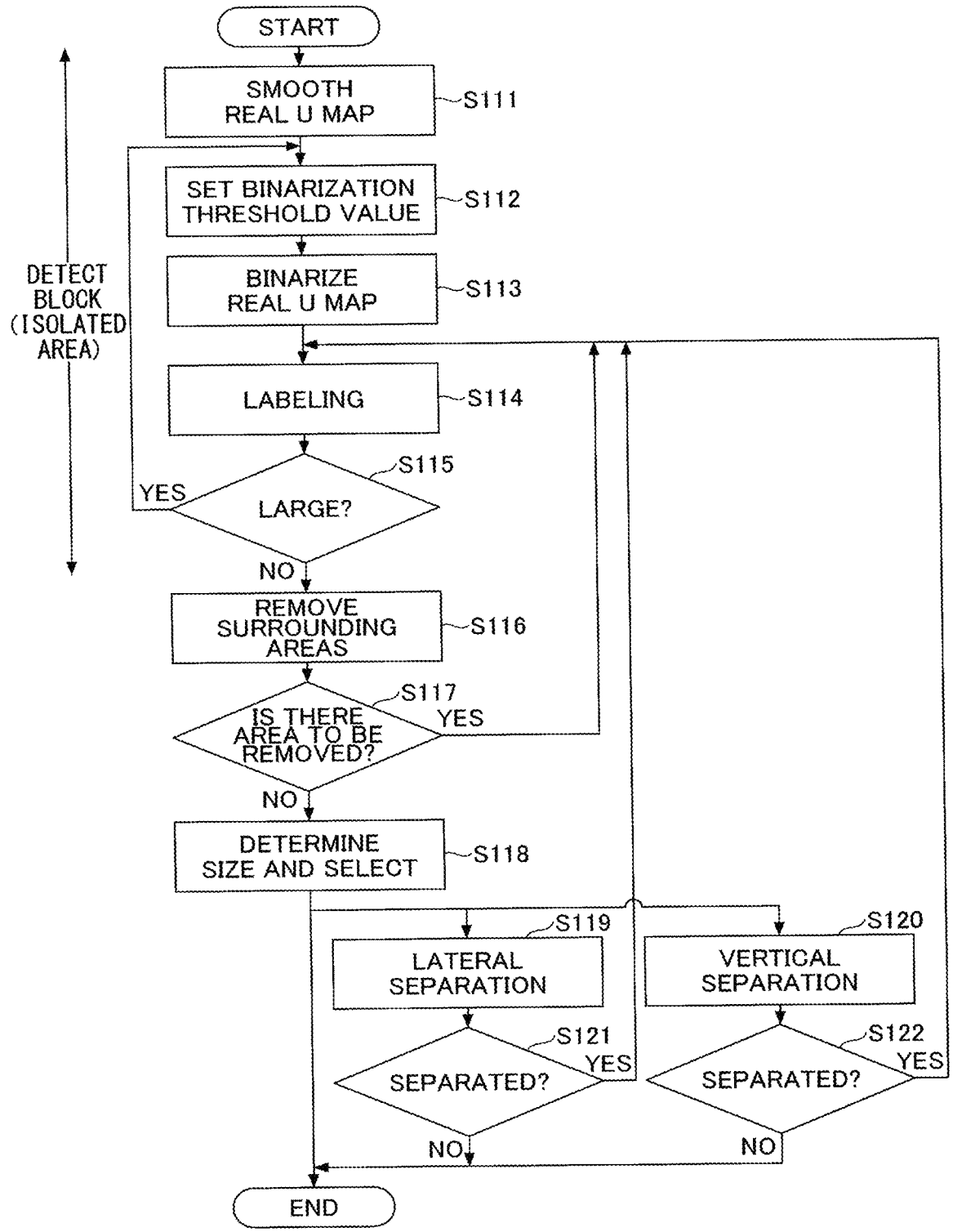
FIG. 17 is a flowchart illustrating a flow of an isolated area detection process performed by an isolated area detecting unit according to an embodiment of the present invention.

Next, an isolated area detecting unit 157 will be described. FIG. 17 is a flowchart illustrating the flow of an isolated area detecting process performed by the isolated area detecting unit 157. The isolated area detecting unit 157 first smooths the information of the real frequency U map generated by the real U map generating unit 156 (step S111).

This is to make it easier to detect a valid isolated area by averaging the frequency values. That is, the disparity value has a distribution due to calculation errors, etc., and the disparity value is not calculated for all pixels, and therefore the real U map includes noise, unlike the schematic diagrams illustrated in FIGS. 14A and 14B. Therefore, in order to remove noise and to facilitate separation of the object to be detected, the real U map is smoothed. Similar to image smoothing, a smoothing filter (for example, a simple average of 3×3 pixels) is applied to the frequency values of the real U map (real frequency U map), thus reducing the frequency considered as noise, and in the object part, a group having a higher frequency than the surroundings is formed, thus achieving an effect of facilitating the isolated area detecting process of a subsequent stage.

Next, a binarization threshold value is set (step S112). At first, a small value (=0) is used to perform binarization of the smoothed real U map (step S113). Subsequently, coordinates with values are labeled to detect an isolated area (step S114).

In these two steps, an isolated area (hereinafter referred to as an "island") whose frequency is higher than the surrounding areas is detected in the real frequency U map. To perform the detection, the real frequency U map is first binarized (step S113). At the beginning, binarization is performed with a threshold value of 0. This is a countermeasure against the fact that some islands are isolated, while other islands are connected to other islands, because of the height of the object, the shape of the object, and separation from the road surface disparity, etc. That is, by binarizing the real frequency U map starting from a small threshold value, it is possible to first detect an isolated island of an appropriate size, and then by increasing the threshold value, connected islands can be separated and isolated islands having an appropriate size can be detected.

As a method of detecting islands after binarization, labeling is used (step S114). The black coordinates after binarization (coordinates whose frequency value is higher than the binarization threshold value) are labeled based on the connectivity, and the areas labeled with the same label area regarded as an island.

The size of each of the plurality of the detected isolated areas is determined (step S115). The detection targets range from pedestrians to large automobiles, and therefore it is determined whether the width of the isolated area is within the range of the size of the detection target. When the size is large (step S115: YES), the binarization threshold value is incremented by 1 (step S112), and binarization is performed only within the isolated area of the real frequency U map (step S113). Then, labeling is performed, a smaller isolated area is detected (step S114), and the size of the isolated area is determined (step S115).

The labeling processing is repeated from the above threshold value setting, to detect an isolated area of a desired size. When an isolated area of a desired size is detected (step S115: NO), the surrounding area is removed next (step S116). The purpose of this process is that in the case of detecting a faraway body, and the accuracy of detecting a road surface is poor, the disparity of the road surface is incorporated into the real U map, and the disparities of the body and the road surface are detected as one block, and therefore a process of deleting the parts in the area on the left and right and nearby where the height is near the road surface (surrounding parts in the isolated area) is performed. When there is an area to be removed (step S117: YES), labeling is performed once again to reset the isolated area (step S114).

When there is no area to be removed (step S117: NO), the size (width and height and distance) of the isolated area for which the surrounding areas have been removed, is determined (step S118), and depending on the determined sizes, lateral separation (step S119) or vertical separation (step S120) is performed, or nothing is performed and the isolated area is registered as an object candidate. When lateral separation or vertical separation is performed (step S121: YES, step S122: YES), labeling is performed once again and the isolated area is reset (step S114).

In the case where bodies are arranged side by side and are close to each other (an automobile and a motorcycle, an automobile and a pedestrian, and two automobiles, etc.), these bodies may be detected as a single isolated area due to smoothing of the real frequency U map. Alternatively, the disparities of different bodies may be connected due to the adverse effect of disparity supplementation in the disparity image. Lateral separation is a process of detecting such a case and separating the connected disparities (details will be described later).

Furthermore, when a plurality of preceding vehicles are traveling in the adjacent lane, and when the preceding vehicles are far away, and when the disparity distribution obtained from the stereo camera image is large, the disparity values of the respective bodies may extend vertically in the real frequency U map, and may be connected to each other. Therefore, this may be detected as a single isolated area in some cases. The vertical separation is a process of detecting such a case and separating the connected area into a preceding vehicle travelling in front of the reference vehicle and a preceding vehicle travelling ahead of the preceding vehicle in front of the reference vehicle (details will be described later).

<<Corresponding Area Detection of Disparity Image and Object Area Extraction>>

Figure 18:
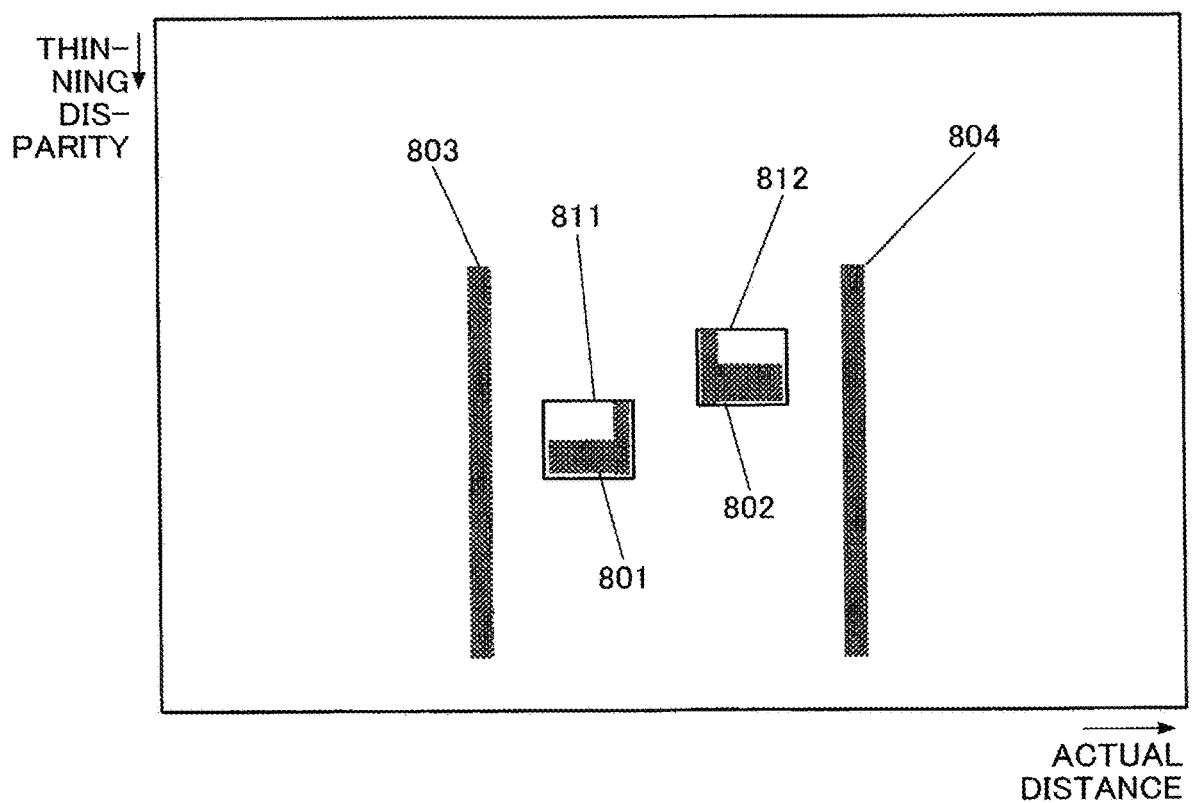
FIG. 18 is a diagram illustrating a real frequency U map in which a rectangular region, having an inscribed isolated region detected by the isolated area detecting unit, is set, according to an embodiment of the present invention.
Figure 19:
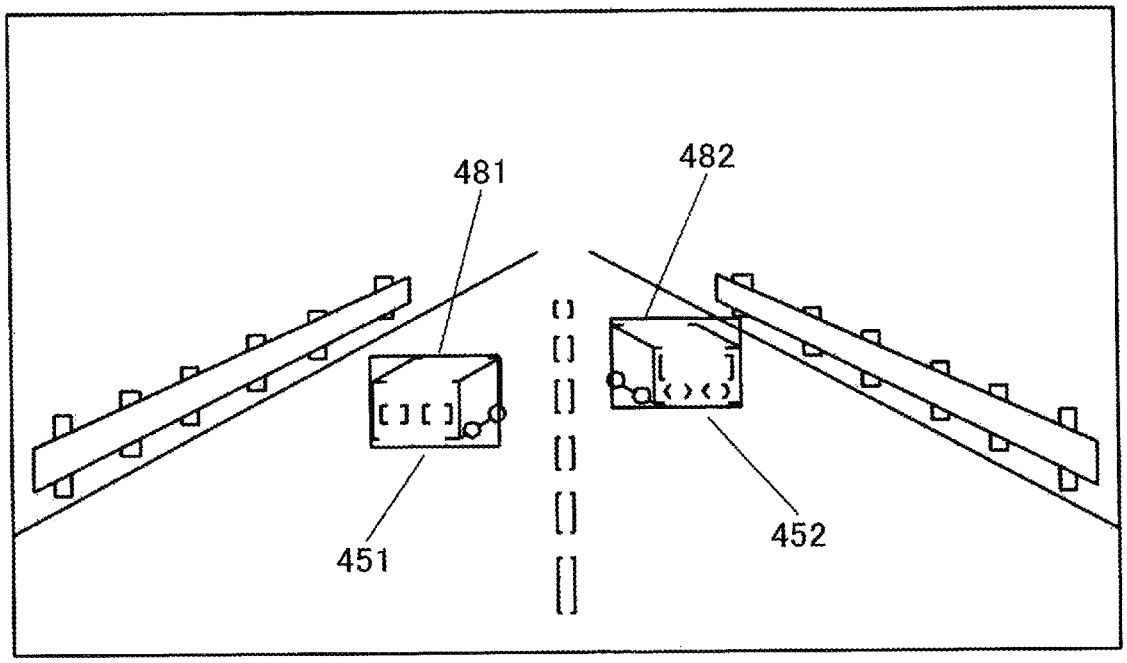
FIG. 19 is a diagram illustrating a disparity image in which a scanning range corresponding to a rectangular area is set, according to an embodiment of the present invention.
Figure 20:
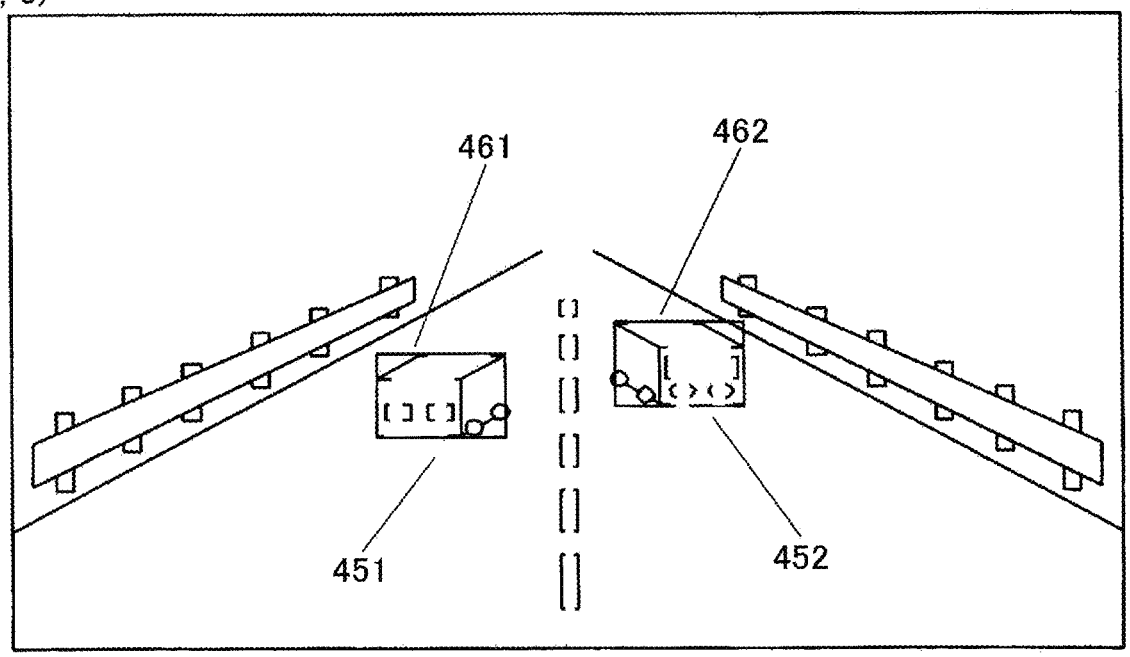
FIG. 20 is a diagram illustrating a disparity image in which an object area is set by searching a scanning range according to an embodiment of the present invention.

Next, a disparity image corresponding area detecting unit 158 and an object area extracting unit 159 of the disparity image will be described. FIG. 18 is a diagram illustrating a real frequency U map in which a rectangular area, in which the isolated area detected by the isolated area detecting unit is inscribed, is set. FIG. 19 is a diagram illustrating a disparity image in which a scanning range corresponding to the rectangular area in FIG. 18 is set. FIG. 20 is a diagram illustrating a disparity image in which an object area is set by searching the scanning range in FIG. 19.

With respect to the isolated areas determined as the object candidate areas by the isolated area detecting unit 157, as illustrated in FIG. 18, a first detected island 811 and a second detected island 812 are set as isolated areas, which are rectangular areas in which a first vehicle 801 and a second vehicle 802 are respectively inscribed. In this case, the width of the rectangular area (length in the X axis direction in the U map) corresponds to the width of the identification target (object) corresponding to the isolated area. Furthermore, the height of the set rectangular area corresponds to the depth (length in the traveling direction of the reference vehicle) of the identification target (object) corresponding to the isolated area. On the other hand, the height of the identification target (object) corresponding to each isolated area is unknown at this stage. In order to obtain the height of the object corresponding to the isolated area relevant to the object candidate area, the disparity image corresponding area detecting unit 158 detects the corresponding area in the disparity image corresponding to the isolated area.

Based on the isolated area information output from the isolated area detecting unit 157, the disparity image corresponding area detecting unit 158 can determine the x direction range (xmin, xmax) of a first detected island corresponding area scanning range 481 and a second detected island corresponding area scanning range 482, which are the ranges to be detected in the disparity image illustrated in FIG. 19, from the position, width, and minimum disparity of the first detected island 811 and the second detected island 812 detected from the real U map. Furthermore, the disparity image corresponding area detecting unit 158 can determine the height and position of the object in the disparity image (from y min="y coordinate corresponding to maximum height from road surface at maximum disparity dmax" to y max="y indicating height of road surface obtained from maximum disparity dmax").

Next, in order to detect the accurate position of the object, the disparity image corresponding area detecting unit 158 scans the set scanning range, and extracts pixels having disparity values in the range of the rectangle depth (minimum disparity dmin, maximum disparity dmax) detected by the isolated area detecting unit 157, as candidate pixels. Then, the disparity image corresponding area detecting unit 158 sets, as a candidate line, a line having a predetermined ratio or more in the lateral direction with respect to the detected width, among the group of extracted candidate pixels.

Next, upon scanning in the vertical direction, if there are other object candidate lines by a predetermined density or more, around a certain object candidate line of interest, the disparity image corresponding area detecting unit 158 determines the object candidate line of interest as an object line.

Next, the object area extracting unit 159 searches for the object line in the search area of the disparity image to determine the lowest end and the uppermost end of the object line, and as illustrated in FIG. 20, the object area extracting unit 159 determines circumscribing rectangles 461 and 462 of the object line group, as areas 451 and 452 of objects (first vehicle and second vehicle) in the disparity image.

Figure 21:
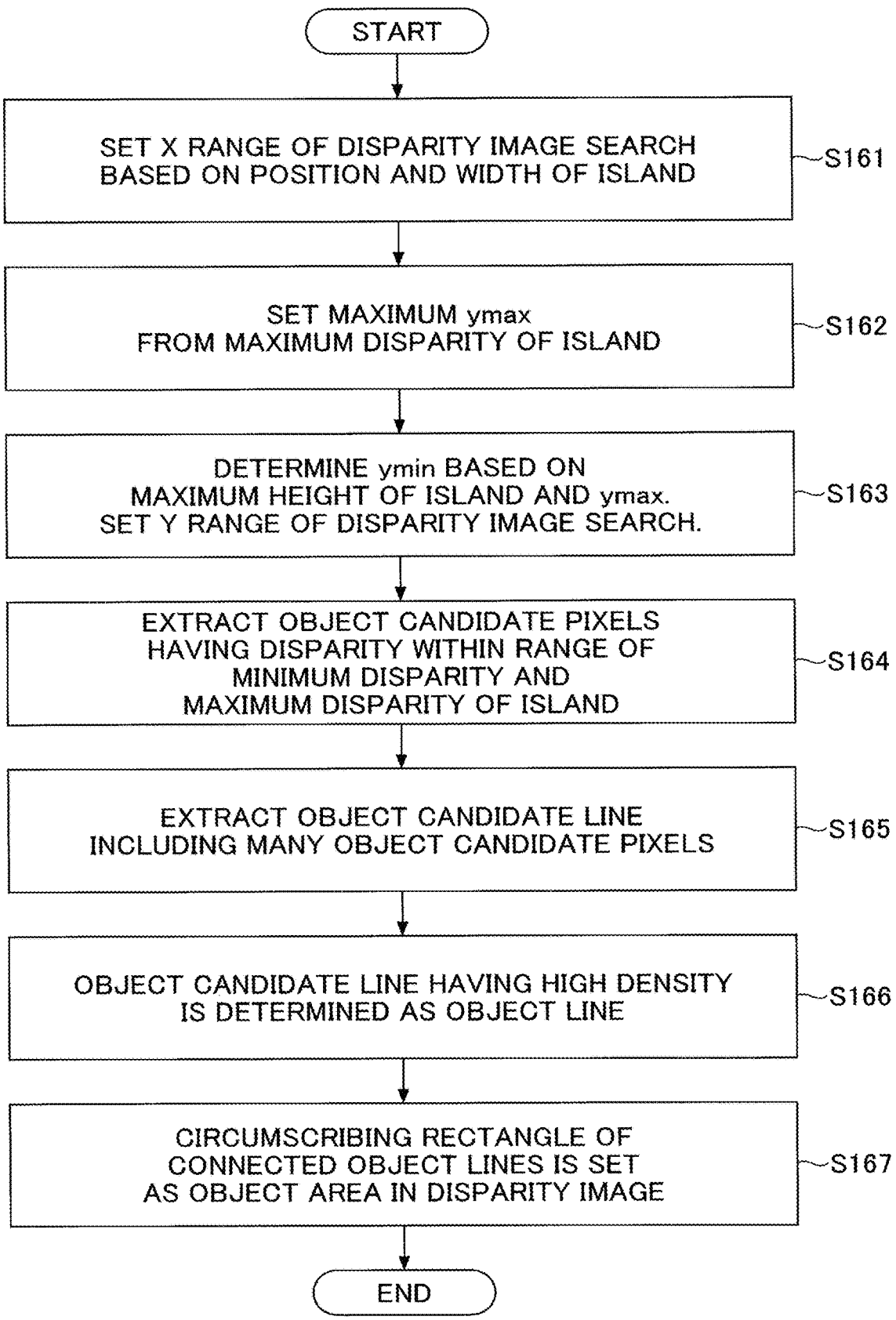
FIG. 21 is a flowchart illustrating a flow of a process performed by a disparity image corresponding area detecting unit and an object area extracting unit according to an embodiment of the present invention.

FIG. 21 is a flowchart illustrating the flow of a process performed by the disparity image corresponding area detecting unit 158 and the object area extracting unit 159. First, a search range in the x axis direction relative to the disparity image is set based on the position, width, and minimum disparity of the island in the real U map (step S161).

Next, from the relationship between the maximum disparity dmax of the island and the height of the road surface, the maximum search value ymax in the y-axis direction with respect to the disparity image is set (step S162). Next, the minimum search value ymin in the y-axis direction with respect to the disparity image is obtained and set based on the maximum height of the island in the real height U map and ymax and dmax set in step S172, so as to set the search range in the y axis direction with respect to the disparity image (step S163).

Next, a disparity image is searched in the set search range to extract pixels within the range of the minimum disparity drain and the maximum disparity d max of the island, and the pixels are set as object candidate pixels (step S164). When there are object candidate pixels by a certain ratio or more in the lateral direction, the corresponding line is extracted as an object candidate line (step S165).

The density of the object candidate line is calculated, and when the density is larger than a predetermined value, the line is determined as the object line (step S166). Finally, the circumscribing rectangle of the object line group is detected as the object area in the disparity image (step S167).

Accordingly, it is possible to recognize the identification target (object, body).

<<Object Type Classification>>

Next, an object type classifying unit 160 will be described.

Based on the height (y omax–y omin) of the object area extracted by the object area extracting unit 159, from the following formula [3], the actual height Ho of an identification target (object) displayed in the image area corresponding to the object area, can be calculated. Here, "zo" is the distance between the object corresponding to the object area calculated from the minimum disparity value d in the object area and the reference vehicle, and "f" is a value obtained by converting the focal length of the camera to the same units as the units of (y omax–y omin).

$$Ho = zo \times (y\,omax - y\,omin)/f \qquad \text{formula [3]}$$

Similarly, from the width (x omax–x omin) of the object area extracted by the object area extracting unit 159, the actual width Wo of the identification target (object) displayed in the image area corresponding to the object area, can be calculated from the following formula [4].

$$Wo = zo \times (x\,omax - x\,omin)/f \qquad \text{formula [4]}$$

Furthermore, the depth Do of the identification target (object) displayed in the image area corresponding to the object area can be calculated by the following formula [5], based on the maximum disparity dmax and the minimum disparity drain in the isolated area corresponding to the object area.

$$Do = BF \times \{(1/(d\min-\text{offset})-1/(d\max-\text{offset})\} \qquad \text{formula [5]}$$

The object type classifying unit 160 classifies the object type from the information on the height, the width, and the depth of the object corresponding to the object area that can be calculated as described above. The table indicated in FIG. 22 indicates an example of table data for classifying object types. According to this table, it is possible to recognize the identification target (object) present in front of the reference vehicle, upon distinguishing between a pedestrian, a bicycle, a compact car, and a truck, etc.

<<Three-Dimensional Position Determination>>

Next, the three-dimensional position determining unit 161 will be described. The distance to the object corresponding to the detected object area and the distance in the image between the image center of the disparity image and the center of the object area in the disparity image are also recognized, and therefore it is possible to determine the three-dimensional position of the object.

When the center coordinates of the object area in the disparity image are defined as (region_centerX, region_c- enterY) and the image center coordinates of the disparity image are defined as (image_centerX, image_centerY), the relative lateral direction position and height direction position of the identification target (object) with respect to the imaging units 110a and 110b can be calculated by the following formula [6] and formula [7].

$$Xo = Zx(\text{region\_centerX} - \text{image\_centerX})/f \quad \text{formula [6]}$$

$$Yo = Zx(\text{region\_centerY} - \text{image\_centerY})/f \quad \text{formula [7]}$$

<<Object Tracking>>

Next, an object tracking unit 162 will be described. The object tracking unit 162 executes a process of tracking an object (body) detected from a frame of a past disparity image, by using the object data list 170.

<<Object Selection>>

Next, an object selecting unit 163 will be described. With respect to an object stored in the object data list 170, the object selecting unit 163 selects whether to track an object, for example, by determining whether the object is at a position suitable for being tracked, etc. Specifically, based on the object prediction data in the object data list 170, after setting a prediction range in the disparity image data in which the object is predicted to be positioned, and identifying the height of the object within the prediction range, the object selecting unit 163 refers to the object feature amount in the object data list 170, identifies the width of the object from the identified height, and estimates the lateral position of the object in the disparity image data from the identified width. When the lateral position of the object estimated in this manner satisfies a predetermined tracking target condition (when the probability that the object is present in the image is high, and in a case where the object is at a position suitable for tracking, etc.), the object is selected as a tracking target. Note that the object selecting unit 163 may delete the data of objects that are not selected as a tracking target, from the object data list 170.

<<Object Data List>>

Next, the object data list 170 will be described. The object data list 170 is used, for example, to track data of each object detected from a single frame over a plurality of subsequent frames.

As illustrated in FIG. 23, the object data list 170 includes data of "object data", "object prediction data", and "object feature amount".

The "object data" includes data of "position", "size", "distance", "relative speed", "actual position", and "actual size". The "position" is the upper left coordinate of the object in the disparity image. The "size" is the size (number of pixels in the width and the height) of the object in the disparity image. The "distance" is the actual distance from the reference vehicle to the object. The "relative speed" is the relative speed between the reference vehicle and the object calculated based on the previous and present frames. The "relative speed" includes data on the amount of movement (m: meters) per frame in the traveling direction Z (depth direction) and horizontal direction X (lateral direction) of the reference vehicle. The "actual position" is the relative actual position of the object with respect to the reference vehicle calculated based on the present frame. The "actual position" includes, for example, data of a position (m: meters) in the lateral direction Z and a position (m: meters) in the depth Z direction of the center of the left end and the right end of the object. The "actual size" is the actual size of the object with respect to the reference vehicle calculated based on the present frame. The "actual size" includes data of the width (m: meters) and the height (m: meters) of the object.

The "object prediction data" includes data such as "position", "size", "distance", and "relative speed", etc. The "object prediction data" is data for predicting the position of the object in the next frame, calculated based on a past frame (for example, the immediately preceding frame).

The "object feature amount" includes data of "histogram peak position" and "distance between peaks". The "histogram peak position" is coordinates of a position where the value of the disparity frequency is relatively large in the real U map. The "distance between peaks" is the actual distance between "histogram peak positions" in the real U map.

Note that the data of the object data list 170 is sent as an analysis result obtained by the image analyzing unit 102, to the display monitor 103 and the vehicle travel control unit 104. The display monitor 103 displays the area of the object in the present frame as a green frame, for example, based on the "position" and "size" of "object data", for example, among the data of the object data list 170 that is the analysis result. Here, "position" and "size" of "object data" are data indicating an area including an object.

Furthermore, the display monitor 103 also displays an area (hereinafter referred to as a "tracking frame") corresponding to the predicted position of the object in the present frame, as a red frame, for example, based on the "position" and "size" of the "object prediction data", for example, among the data of the object data list 170 that is the analysis result.

<Summary>

In a disparity image generated by using a stereo camera, the disparity of a body, which is located at a distance close to the reference vehicle (stereo camera), is large, and therefore the distance between the position of the pixel of the body in the image captured by one of the cameras and the position of the pixel of the body in the image captured by the other one of the cameras becomes long. Therefore, the distance from the position of the pixel of the object in the captured image becomes large. Therefore, the distance (the distance from the position of one pixel) of searching the pixel corresponding to the one pixel of one image from the other image becomes long, and it takes time for the process of creating the disparity image.

Therefore, it can be considered that by dividing the distance for searching for pixels by a predetermined range, a disparity image for a body positioned at a distance of, for example, approximately 2 m to 80 m (regular distance) from the reference vehicle can be generated at high speed, and detection and tracking of the body can be performed.

However, in order to prevent a collision, etc., it is necessary to detect and track a body positioned at a distance of, for example, 1 m to 6 m (short distance) from the reference vehicle. In this case, it takes time for the process of creating a disparity image for a body at a short distance, and therefore it is necessary to perform the subsequent processes such as detection at a very high speed. Furthermore, detection of a body at a short distance, etc., can also be used for controlling the determination of a moving body, for example, when erroneously stepping on an accelerator or a brake (erroneous depression), etc., and therefore it is necessary to perform detection, etc., at high speed and with high accuracy.

According to the above-described embodiment, pixels are extracted at predetermined intervals from a disparity image, and when the value of the extracted pixel is invalid, the value of the extracted pixel is determined based on the values of pixels surrounding the extracted pixel, and the number of pixels of the disparity image is reduced. Accordingly, highly accurate detection can be performed at high speed.

The system configuration in the above-described embodiment is merely an example, and it is obvious that there are various system configuration examples according to the application and the purpose.

For example, as the short distance described above, detection and tracking of a body positioned at a distance of, for example, approximately 0.5 m to 60 m may be performed.

Furthermore, a stereo camera and a detection device such as a millimeter wave radar or a laser radar may be used in combination, to combine the detection results of detecting a body obtained by the above-described stereo camera with detection results obtained by the detection device, to further improve detection accuracy. Furthermore, instead of a disparity image generated based on a captured image of a stereo camera, data obtained by measuring the area in front of the reference vehicle in the travelling direction by a detection device such as a millimeter wave radar and a laser radar, may be used as the distance image.

For example, each functional unit of the processing hardware unit 120 and the image analyzing unit 102 may be implemented by hardware, or may be implemented by the CPU executing a program stored in the storage device. This program may be recorded in a computer-readable recording medium and distributed as a file in an installable format or an executable format. Examples of the recording medium include a Compact Disc Recordable (CD-R), a Digital Versatile Disk (DVD), and a Blu-ray Disc, etc. Furthermore, a recording medium such as a Compact Disk Read-Only Memory (CD-ROM) in which each program is stored, and the HD 504 in which the program is stored, can be provided as a program product domestically or overseas.

According to the disclosed technique, highly accurate detection can be performed at high speed.

The image processing apparatus, the imaging apparatus, the mobile device control system, the image processing method, and the recording medium are not limited to the specific embodiments described in the detailed description, and variations and modifications may be made without departing from the spirit and scope of the present invention.

What is claimed is:

1. An image processing apparatus, comprising:
a first generator configured to generate a first distance image, corresponding to a first distance from an imager, based on an image captured by the imager;
a second generator configured to generate a second distance image, corresponding to a second distance that is further away from the imager than the first distance, based on the image;
a reducing circuit configured to generate a reduced image from a portion of the first distance image;
a first detector configured to detect whether a body is positioned within a first area, corresponding to the first distance from the imager, based on the reduced image; and
a second detector configured to detect whether the body is positioned within a second area, corresponding to the second distance from the imager, based on the second distance image, wherein
the reducing circuit generating the reduced image and the first detector detecting whether the body is positioned within the first area are performed concurrently to the second detector detecting whether the body is positioned within the second area.

2. The image processing apparatus according to claim 1, wherein
the first generator generates a first disparity image by searching a plurality of images captured by a plurality of imagers for a disparity within a first range corresponding to the first distance from the plurality of the imagers, and
the second generator generates a second disparity image by searching the plurality of images captured by the plurality of imagers for a disparity within a second range corresponding to the second distance from the plurality of the imagers.

3. The image processing apparatus according to claim 1, wherein the reducing circuit extracts, from the first distance image, a pixel at a predetermined interval, and determines a value of the extracted pixel based on a value of a surrounding pixel surrounding the extracted pixel, in response to determining that the value of the extracted pixel is invalid.

4. The image processing apparatus according to claim 3, wherein the reducing circuit determines that the value of the extracted pixel is invalid in response to determining that the value of the extracted pixel is a value indicating infinity or a value indicating a repeating pattern.

5. The image processing apparatus according to claim 3, wherein the reducing circuit acquires, from among the values of a plurality of the surrounding pixels surrounding the extracted pixel, the value of the surrounding pixel in an ascending order of nearness to the extracted pixel, and sets the acquired value of the surrounding pixel as the value of the extracted pixel, in response to determining that the acquired value of the surrounding pixel is not invalid.

6. The image processing apparatus according to claim 3, wherein the reducing circuit sets an average value of the values of a plurality of the surrounding pixels surrounding the extracted pixel as the value of the extracted pixel.

7. An imaging apparatus, comprising:
an imager;
a first generator configured to generate a first distance image, corresponding to a first distance from the imager, based an image captured by the imager;
a second generator configured to generate a second distance image, corresponding to a second distance that is further away from the imager than the first distance, based on the image;
a reducing circuit configured to generate a reduced image from a portion of the first distance image;
a first detector configured to detect whether a body is positioned within a first area, corresponding to the first distance from the imager, based on the reduced image; and
a second detector configured to detect whether the body is positioned within a second area, corresponding to the second distance from the imager, based on the second distance image, wherein
the reducing circuit generating the reduced image and the first detector detecting whether the body is positioned within the first area are performed concurrently to the second detector detecting whether the body is positioned within the second area.

8. A mobile device control system, comprising:
the imager configured to capture the image, wherein the image is of an area in front of a mobile body, and the imager being installed in the mobile body;
the image processing apparatus according to claim 1; and
control circuitry configured to control the mobile body based on results of the detections by the first detector and the second detector.

9. The mobile body comprising:
the mobile device control system according to claim 8, wherein
the mobile body is controlled by the control circuitry.

10. A non-transitory computer-readable recording medium storing a program that causes a computer to execute a process performed by an image processing apparatus, the process comprising:
generating a first distance image, corresponding to a first distance from an imager, based on an image captured by the imager;
generating a second distance image, corresponding to a second distance that is further away from the imager than the first distance, based on the image;
generating a reduced image from a portion of the first distance image;
first detecting whether a body is positioned within a first area, corresponding to the first distance from the imager, based on the reduced image; and
second detecting whether the body is positioned within a second area, corresponding to the second distance from the imager, based on the second distance image, wherein
the generating the reduced image and the first detecting whether the body is positioned within the first area are performed concurrently to the second detecting whether the body is positioned within the second area.

11. The image processing apparatus according to claim 1, wherein the body is a vehicle.

12. The image processing apparatus according to claim 1, wherein
the first generator generates a first disparity image from a plurality of images captured by a plurality of imagers, and
the second generator generates a second disparity image from the plurality of images.

13. The image processing apparatus according to claim 1, further comprising:
processing circuitry configured to control a display to display analysis results of the first detector and the second detector.

14. The image processing apparatus according to claim 1, further comprising:
processing circuitry configured to control a display to display, in a case that the first detector detects that the body is positioned within the first area, a warning to alert a user that the body is positioned within the first area.

15. The image processing apparatus according to claim 1, further comprising:
processing circuitry configured to control a display to display, in a case that the second detector detects that the body is positioned within the second area, a warning to alert a user that the body is positioned within the second area.

16. The imaging apparatus according to claim 7, wherein the body is a vehicle.

17. The imaging apparatus according to claim 7, wherein
the first generator generates a first disparity image from a plurality of images captured by a plurality of imagers, and
the second generator generates a second disparity image from the plurality of images.

18. The imaging apparatus according to claim 7, further comprising:
processing circuitry configured to control a display to display analysis results of the first detector and the second detector.

* * * * *